(12) United States Patent
Narita

(10) Patent No.: US 6,178,053 B1
(45) Date of Patent: *Jan. 23, 2001

(54) STORAGE APPARATUS FOR REDUCING A READ ERROR CAUSED BY A THERMAL ASPERITY OF A MAGNETO-RESISTIVE HEAD

(75) Inventor: Teruyuki Narita, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/951,460

(22) Filed: Oct. 16, 1997

(30) Foreign Application Priority Data

Jun. 13, 1997 (JP) ................................. 9-156261

(51) Int. Cl.[7] ................................ G11B 5/09; G11B 5/02
(52) U.S. Cl. ........................... 360/25; 360/46; 360/53
(58) Field of Search ........................ 360/25, 31, 46, 360/53, 51, 75

(56) References Cited

U.S. PATENT DOCUMENTS 5,687,036 * 11/1997 Kassab ................................. 360/53
5,856,983 * 1/1999 Okazaki ............................... 360/67
5,872,671 * 2/1999 Suzuki et al. ........................ 360/25
5,898,532 * 4/1999 Du et al. .............................. 360/46
5,901,001 * 5/1999 Meyer et al. ........................ 360/31
5,995,313 * 11/1999 Dakroub ............................. 360/67

FOREIGN PATENT DOCUMENTS 9-91856   4/1997 (JP) .

* cited by examiner

Primary Examiner—W. Chris Kim
Assistant Examiner—Regina Y. Neal
(74) Attorney, Agent, or Firm—Staas & Halsey LLP

(57) ABSTRACT

For a read demodulating unit for demodulating read data and servo data which is used for head positioning from a reproduction waveform signal of a magneto-resistive head, a thermal asperity fault detecting unit for setting a predetermined threshold for the reproduction waveform signal and for generating a fault signal when the reproduction waveform signal exceeds the threshold is provided. When a thermal asperity fault is detected by the thermal asperity fault detecting unit, an increase in cut-off frequency of a high pass filter, an automatic gain control lock by an automatic gain control holding circuit, and a phase lock loop lock by a phase lock loop holding circuit are executed in an error avoiding unit.

12 Claims, 20 Drawing Sheets

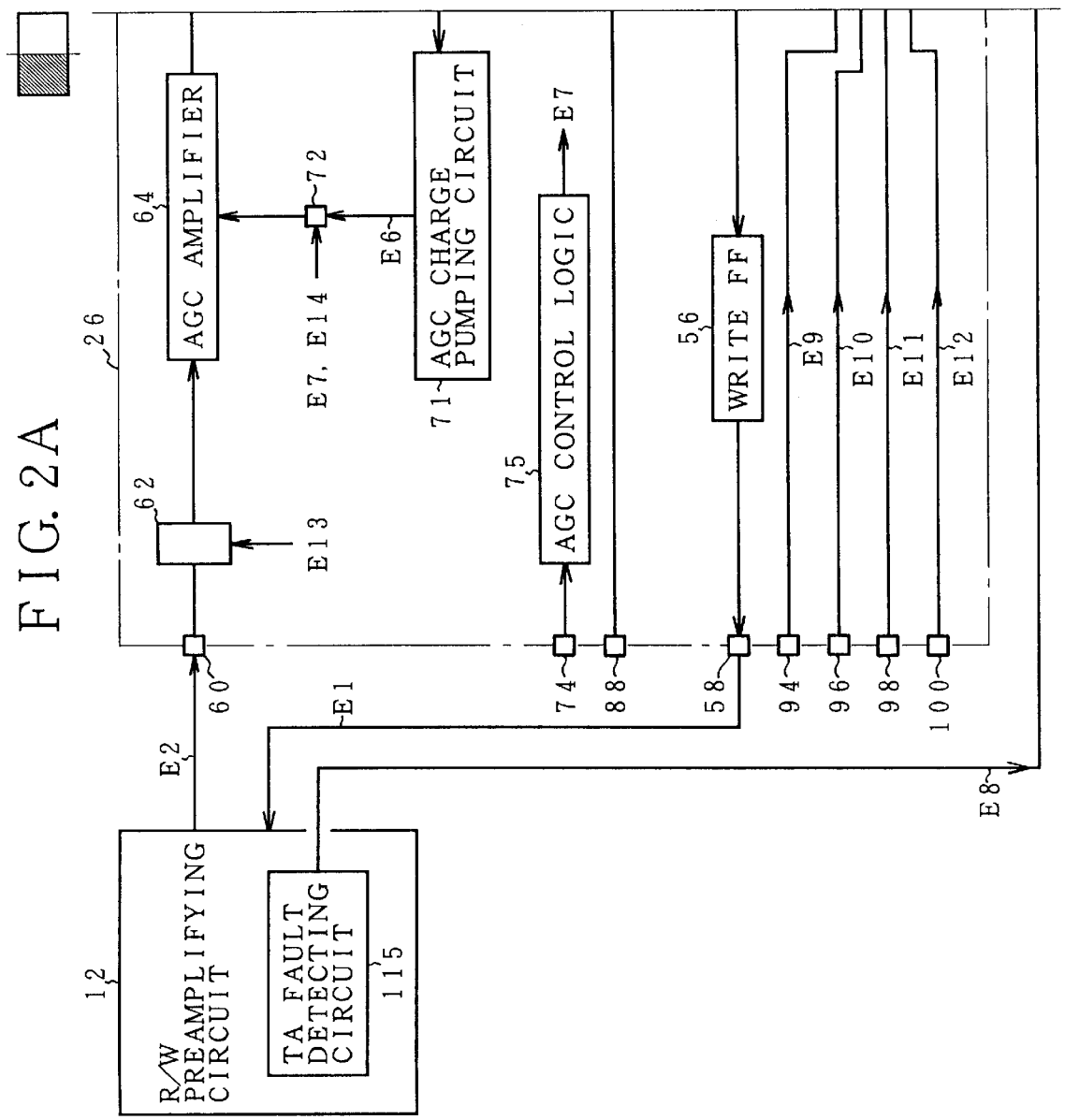

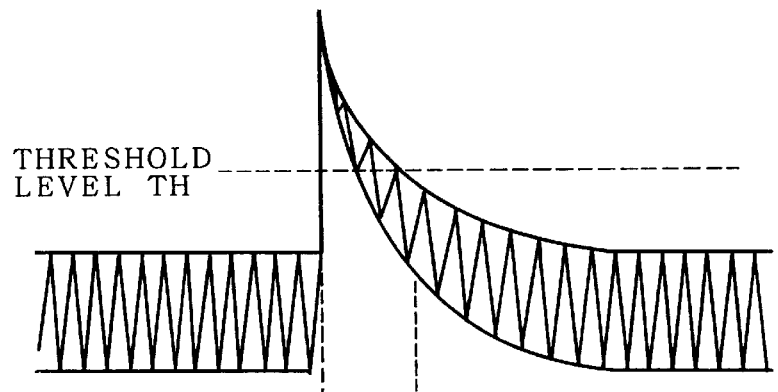
FIG. 4A
READ
SIGNAL
E2
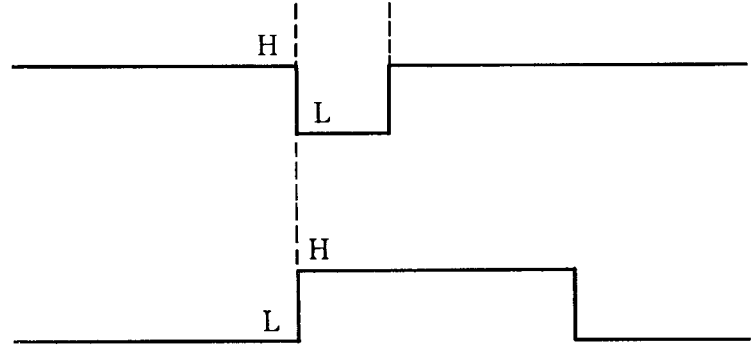
FIG. 4B
FAULT
SIGNAL
E8
FIG. 4C
FILTER
SWITCHING
SIGNAL
E13
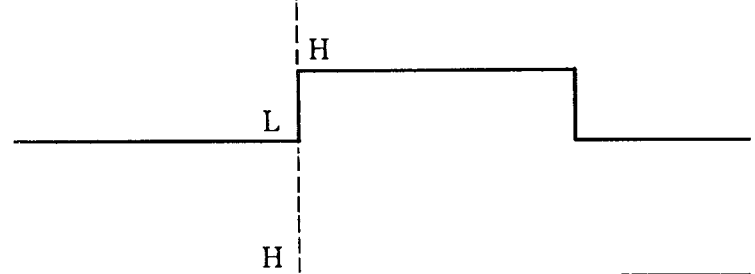
FIG. 4D
AGC
HOLDING
SIGNAL
E14
FIG. 4E
PLL
HOLDING
SIGNAL
E15
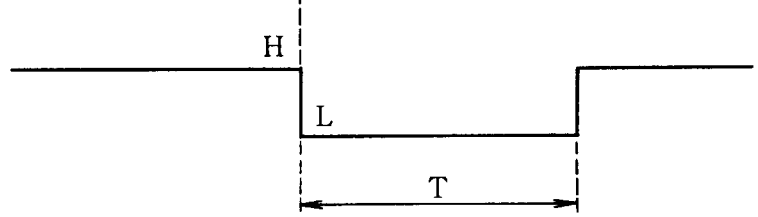

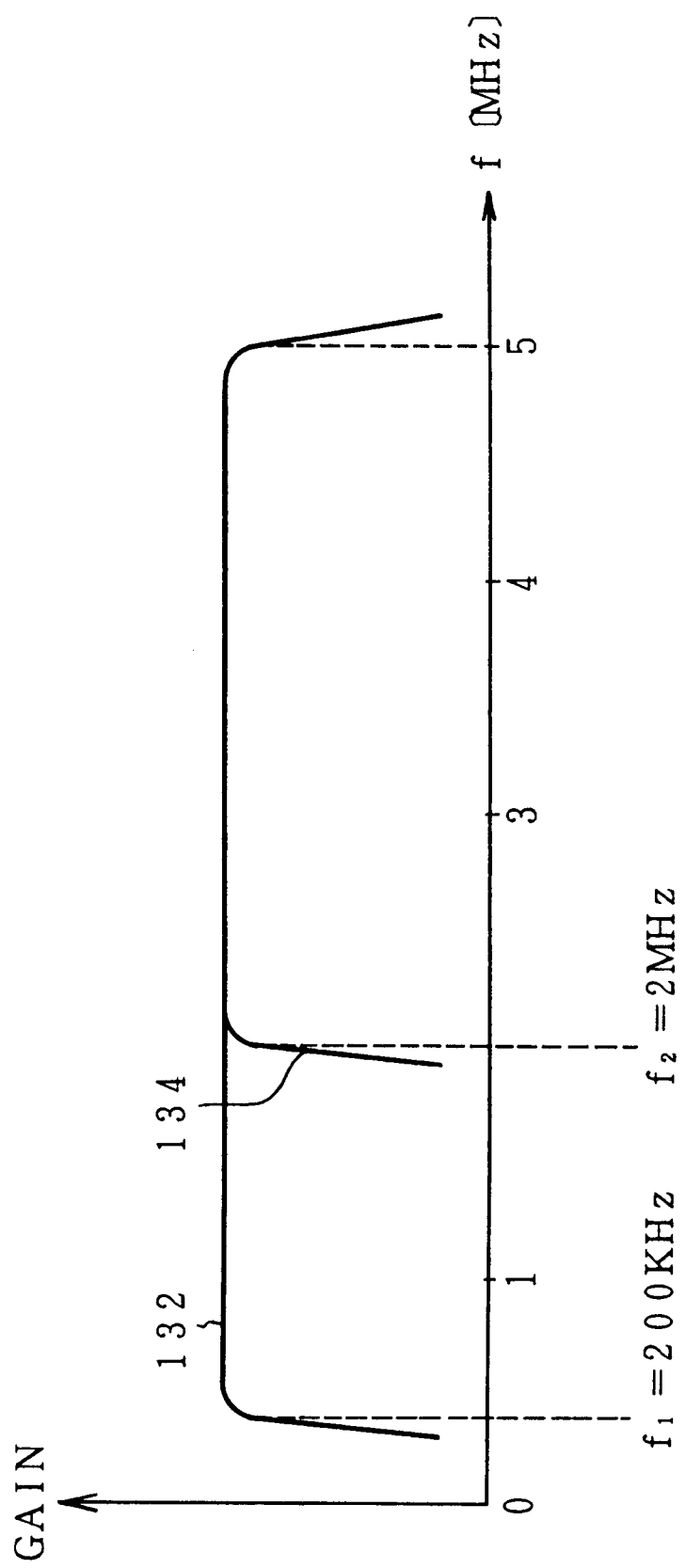

FIG. 7A
READ
SIGNAL
E2
FIG. 7B
FAULT
SIGNAL
E8
FIG. 7C
FILTER
SWITCHING
SIGNAL
E13
FIG. 7D
HPF
OUTPUT
SIGNAL
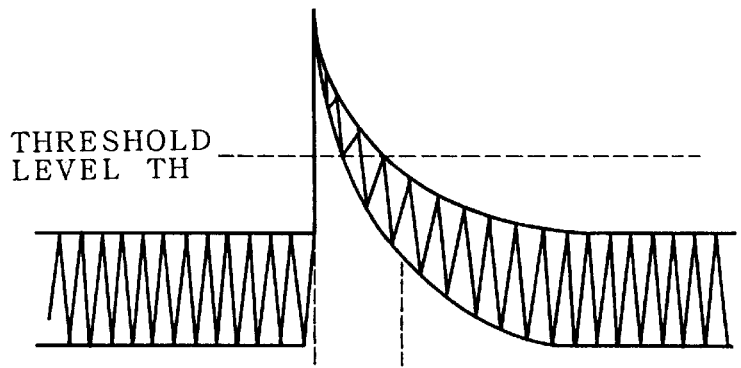
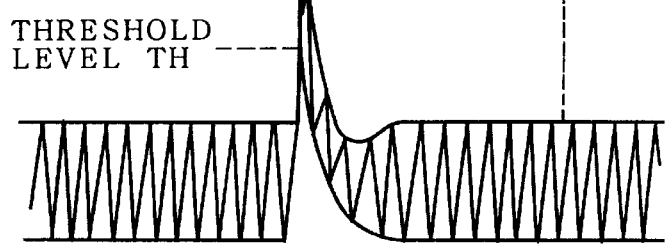

FIG. 9A
READ SIGNAL E2
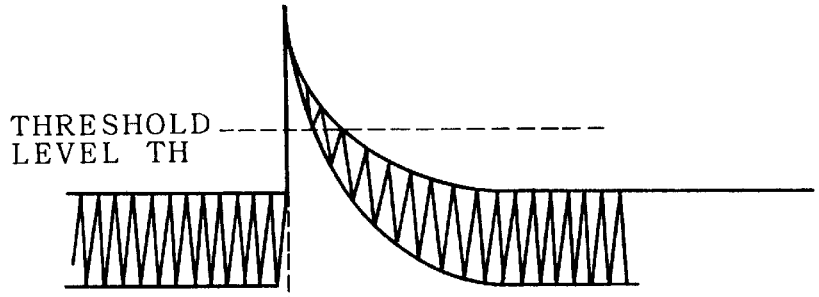
FIG. 9B
FAULT SIGNAL E8
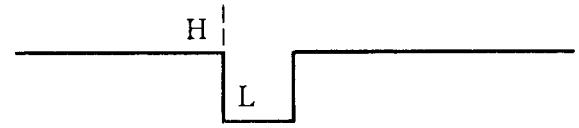
FIG. 9C
PLL HOLDING SIGNAL E15
FIG. 9D
VCO CONTROL VOLTAGE E16
(NO PLL LOCK)
FIG. 9E
VCO CONTROL VOLTAGE E16
(PLL LOCK IS PERFORMED)
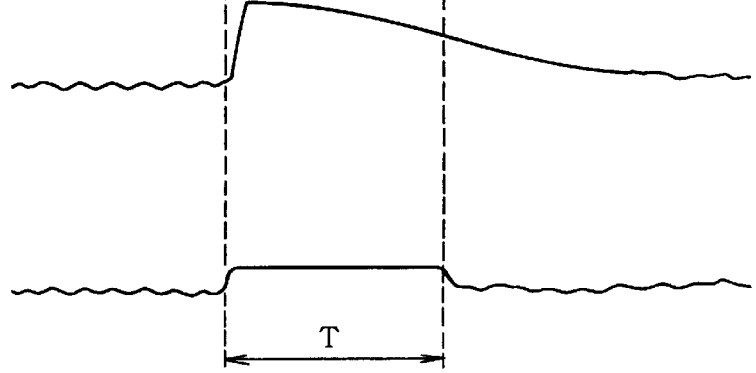

FIG. 12

| ADR1 | ADR0 | DATA5 | DATA4 | DATA3 | DATA2 | DATA1 | DATA0 |
|---|---|---|---|---|---|---|---|
| 0 | 0 | XSLP | XIDL | HS3 | HS2 | HS1 | HS0 |
| 0 | 1 | GAIN | TARFH | IB3 | IB2 | IB1 | IB0 |
| 1 | 0 | TAREC | TACMP | TA3 | TA2 | TA1 | TA0 |
| 1 | 1 | BST1 | BST0 | IW3 | IW2 | IW1 | IW0 |

FIG. 13

| TA3 | TA2 | TA1 | TA0 | TA Threshold (mV) |
|---|---|---|---|---|
| 0 | 0 | 0 | 0 | off(No fault) |
| 0 | 0 | 0 | 1 | 49 |
| 0 | 0 | 1 | 0 | 53 |
| 0 | 0 | 1 | 1 | 57 |
| 0 | 1 | 0 | 0 | 63 |
| 0 | 1 | 0 | 1 | 70 |
| 0 | 1 | 1 | 0 | 78 |
| 0 | 1 | 1 | 1 | 91 |
| 1 | 0 | 0 | 0 | 105 |
| 1 | 0 | 0 | 1 | 123 |
| 1 | 0 | 1 | 0 | 146 |
| 1 | 0 | 1 | 1 | 175 |
| 1 | 1 | 0 | 0 | 210 |
| 1 | 1 | 0 | 1 | 256 |
| 1 | 1 | 1 | 0 | 312 |
| 1 | 1 | 1 | 1 | 385 |

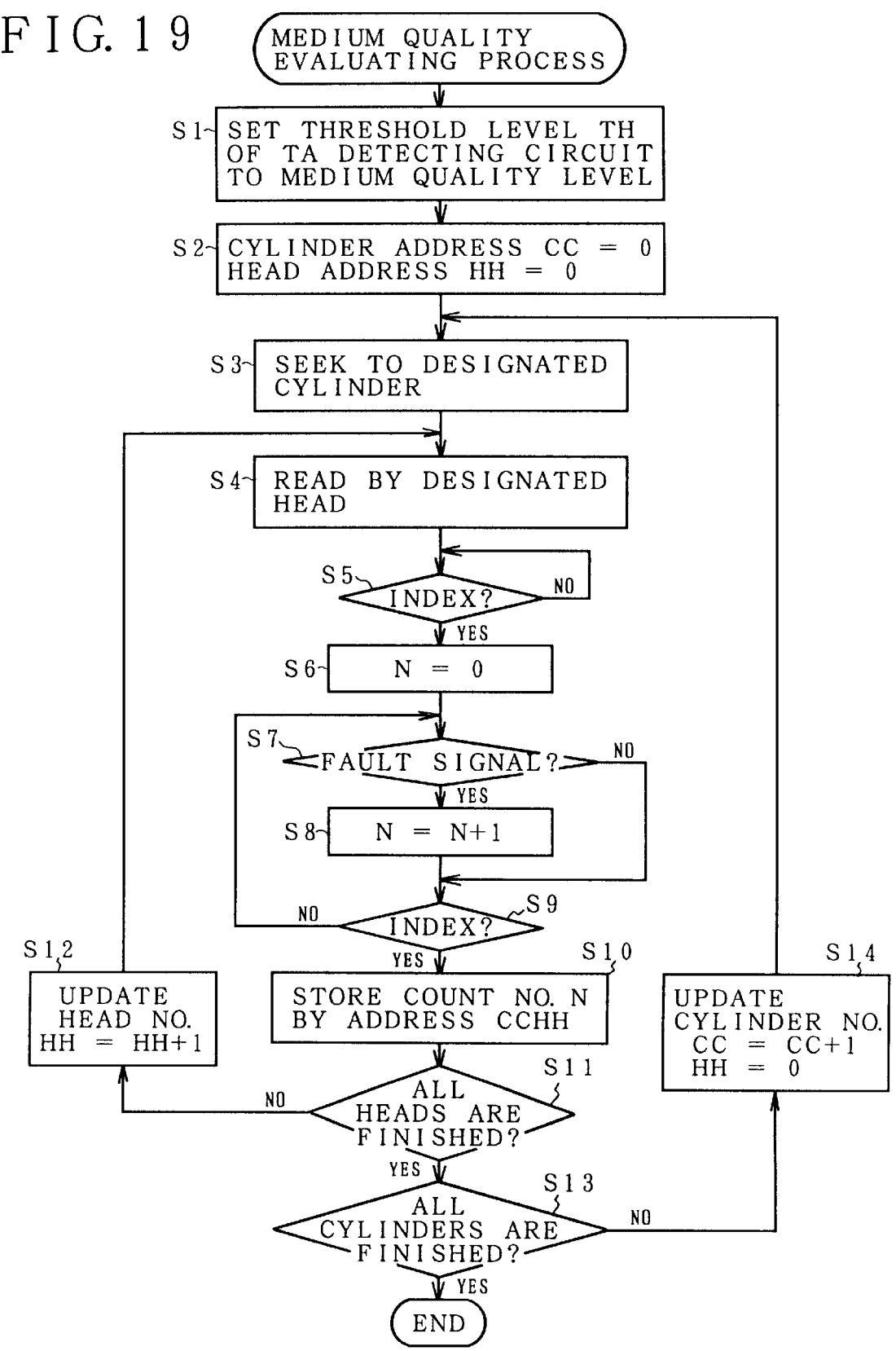

STORAGE APPARATUS FOR REDUCING A READ ERROR CAUSED BY A THERMAL ASPERITY OF A MAGNETO-RESISTIVE HEAD

BACKGROUND OF THE INVENTION

The present invention relates to a storage apparatus for magnetically recording and reproducing information to/from a disk medium and, more particularly, to a storage apparatus for reducing a read error caused by a thermal asperity of an MR head.

In association with an increase in information amount in an information-oriented society dealing with multimedia data in recent years, an increase in storage capacity of a magnetic disk apparatus as a peripheral apparatus of a computer is requested. In order to increase the storage capacity, it is necessary to increase a density on a medium recording surface by improving a bit density BPI or a track density TPI per unit length. In order to increase the bit density BPI on the medium recording surface, it is necessary to improve frequency characteristics of a magnetic head or medium, and to improve a magnetic head or a medium such that an output of the head is not dropped even at a high frequency and high frequency noises are not increased.

At present, the magnetic head is divided into a reproducing head and a recording head in order to efficiently reproduce data written in a medium. An MR (Magneto-Resistive) head is used as a reproducing head. The MR head converts a recorded magnetic field change into a resistance value change. The resistance value change is further converted into a voltage change by a preamplifier provided for a head IC, thereby reproducing recording data. When the MR head is used, a thermal asperity (called "TA" hereinbelow) phenomenon becomes a problem. The TA phenomenon is a phenomenon such that a resistance value is rapidly changed by heat generated when an MR device comes into contact with a medium scratch or dust on the medium and a base line of a reproduction waveform is shifted, so that data cannot be reproduced. Especially, since a head floating amount tends to be decreased more and more in order to efficiently reproduce data, there is a tendency such that the TA phenomenon often occurs due to a reduction in medium clearance of the MR head.

In a conventional magnetic disk apparatus, when a read error of data or a read error of servo information occurs by external noises, a shock, or the like, the error is recovered by re-reading the data. That is, the external noises and shock are temporary phenomena and the error can be usually avoided by the re-reading operation. On the contrary, the error due to the TA phenomenon is a fixed error that is caused by a scratch of the medium or the like, so that the error cannot be avoided by the re-reading operation. Usually, the error is regarded as a medium defect and an alternating process is executed. In the conventional magnetic disk apparatus, however, whether the read error is caused by the external noises or the TA phenomenon cannot be distinguished, the re-reading operation is executed in spite of a fact that the error is the unrecoverable error caused by the TA phenomenon. The number of times of the re-reading operations is generally determined to be, for example, 100 times. Consequently, with respect to the read error caused by the TA phenomenon, only after the re-reading operation was performed 100 times, the error is decided to be the unrecoverable read error and a message indicating that the operation was finished as an abnormality is reported to an upper apparatus. Consequently, it takes a long time for a process when the read error occurs due to the TA phenomenon and there is a problem such that an accessing performance of the magnetic disk apparatus largely deteriorates.

SUMMARY OF THE INVENTION

According to the present invention, there is provided a storage apparatus such as a magnetic disk apparatus or the like in which a TA phenomenon is detected and an error avoiding process is properly executed, thereby raising accessibility.

A storage apparatus of the invention comprises: a fault detecting unit for setting a predetermined threshold level (hereinbelow, simply called a "threshold") for a reproduction waveform signal into a read demodulating unit for demodulating read data and servo data which is used for head positioning from the reproduction waveform signal of an MR head serving as a read head and for outputting a fault signal when the reproduction waveform signal exceeds the threshold; and an error avoiding unit which is provided for the read demodulating unit and operates so as to avoid a read error when the fault signal is generated. The fault detecting unit detects an abnormal fluctuation of the reproduction waveform signal caused by the TA (Thermal Asperity) when the MR head is used as a read head and generates the fault signal. The error avoiding unit operates so as to promptly recover the abnormal fluctuation of the reproduction waveform signal due to the TA when the MR head is used as a read head. The error avoiding unit operates so as to promptly recover the abnormal fluctuation of the reproduction waveform signal for a predetermined time T in which the abnormal fluctuation of the reproduction waveform signal caused by the TA continues from a time point when the fault signal is obtained. The time T of the avoiding operation is set to a time within a time that is several times as long as the time of the abnormality fluctuation of the reproduction waveform signal due to the TA. The error avoiding unit raises a cut-off frequency of a high pass filter provided for the read demodulating unit when the fault signal is obtained, thereby promptly recovering the abnormal fluctuation of the reproduction waveform signal due to the TA. When the cut-off frequency of the high pass filter is raised, a frequency band of low frequency components which can be attenuated when a base line of the reproduction waveform signal due to the TA phenomenon rises like a pulse is widened and a fluctuation amount and a period of the base line are reduced. For example, with respect to the read data, a data lost length can be suppressed to a range where errors can be corrected by an ECC. When the fault signal is obtained, the error avoiding unit holds a gain of an AGC (Automatic Gain Control) amplifier provided for the read demodulating unit to a value at a time point when the fault signal is obtained, thereby suppressing an AGC loop from being disturbed by the abnormal fluctuation of the reproduction waveform signal due to the TA. Further, when the fault signal is obtained, the error avoiding unit holds a loop gain of a PLL which is provided for the read demodulating unit and is used for generating a read clock to the value at the time point when the fault signal is obtained, thereby suppressing the PLL loop from being disturbed by the abnormal fluctuation of the reproduction waveform signal due to the TA.

Further, according to the present invention, the fault detecting unit has a threshold setting unit for setting an optimum threshold for detecting the TA fault. The threshold setting unit monitors the presence or absence of an output of the fault signal while decreasing the threshold of the fault detecting unit in a state where the MR head is positioned to a predetermined position of the disk medium and a reproducing operation is executed. The threshold setting unit detects the threshold to discriminate the presence or absence of the generation of the fault signal and sets the threshold to an amplitude value AM of the reproduction waveform signal. A value ($\alpha \cdot$AM) obtained by multiplying the detected amplitude value AM with a predetermined coefficient $\alpha$ (for example, $\alpha$=2) is set as a threshold TH into the fault detecting unit. The threshold setting unit positions the head into a servo region of the disk medium and detects an amplitude value of the reproduction waveform signal. It is also possible to position the head into a data region of the disk medium and to detect the amplitude value of the reproduction waveform signal. The threshold setting unit also sequentially designates and positions the head (head number HH) every cylinder (cylinder number CC) of the disk medium, detects the amplitude value of the reproduction signal at which the fault signal is generated or not and records the detected amplitude value into a memory or the disk medium, reads the amplitude value corresponding to the selected head (HH) and the cylinder position (CC) upon reading operation, and sets the threshold into the fault detecting unit. When the head is positioned to each cylinder of the disk medium and the amplitude value of the reproduction signal at which the fault signal is generated or not is detected, if the detected amplitude value is equal to or smaller than a predetermined minimum value, the threshold setting unit increases an amplification factor of an amplifier provided at the front stage of the fault detecting unit and, after that, detects the amplitude value again. Consequently, the threshold for the TA detection is not set to be too low by detecting the amplitude of the reproduction waveform signal whose amplitude level is too low, thereby preventing an erroneous detection of the fault signal due to the TA phenomenon. The read demodulating unit connected to a read/write (called "R/W" hereinbelow) preamplifying circuit mounted as a head IC has a data demodulating circuit for demodulating the read data and a servo demodulating circuit for demodulating the servo data. The R/W preamplifying circuit has an amplifier whose gain can be controlled, a TA fault detecting circuit, and a register for setting the gain of the amplifier and the threshold of the fault detecting circuit by a serial transfer from a control unit such as an MCU or the like.

In a modification of the present invention, a re-reading process accompanying the operation to avoid an error caused due to the TA phenomenon is executed under a condition such that both of the fault signal due to the TA phenomenon and the read error are detected as a prerequisite. That is, according to the modification of the invention, an amplifier for amplifying the reproduction waveform signal of the read head is provided. For the read demodulating unit for demodulating the read data and the servo data which is used for the head positioning from the reproduction waveform signal generated from the amplifier, there are provided: a read error detecting unit for detecting an error of the read data or servo data demodulated by the read demodulating unit; a fault detecting unit for setting a predetermined threshold for the reproduction waveform signal generated by the amplifier and for outputting a fault signal when the reproduction waveform signal exceeds the threshold; and an error avoiding unit which operates so as to avoid the error in the read demodulating unit when the fault signal is generated. Further, there is provided a re-reading processing unit for validating an operation of the error avoiding unit and executing the re-reading operation when both of the error of the read error detecting unit and the fault signal of the fault detecting unit are simultaneously obtained by a reading process of one time. When the fault detecting circuit generates the fault signal not by the TA phenomenon but by an erroneous operation so that a read error is not detected and the operation is normally finished, the unnecessary error avoiding operation of the error avoiding unit by the erroneously detected fault signal can be inhibited, and the problem that the read error is contrarily induced by the error avoiding operation can be solved. On the other hand, according to another embodiment of the invention, a function for measuring evaluation data of a medium quality is realized by using a point that the setting of the threshold of the fault detecting unit can be changed. That is, according to another embodiment of the invention, there are provided: a read demodulating unit for demodulating read data and servo data which is used for head positioning from a reproduction waveform signal of a read head; a fault detecting unit for setting a predetermined threshold for the reproduction waveform signal and outputting a fault signal when the reproduction waveform signal exceeds the threshold; a threshold setting unit for setting the threshold of the fault detecting unit to a predetermined medium quality level; and further, a medium quality evaluating unit for detecting the number of TAs, a generating position, a level, and the like from the fault signal and reporting to a tester while positioning the head to a whole surface of a disk medium.

The above and other objects, features, and advantages of the present invention will become more apparent from the following detailed description with reference to the drawings.

BRIEF DESCRIPTION OF THE DRAWINGS

FIGS. 2A and 2B are block diagrams of a read channel circuit in FIG. 1;

FIGS. 4A to 4E are time charts for a detection of a fault signal by a TA detecting circuit in FIGS. 2A and 2B and the error avoiding operation;

FIG. 6 is a characteristics diagram of a cut-off frequency of the high pass filter in FIG. 5;

FIGS. 7A to 7D are time charts for a recovering situation of a read signal fluctuated by a TA due to an increase in cut-off frequency of the high pass filter;

FIGS. 9A to 9E are time charts for the PLL locking operation by FIGS. 2A and 2B;

FIG. 12 is an explanatory diagram of register set contents by the serial transfer data;

FIG. 13 is an explanatory diagram of set contents of a threshold by the serial transfer data;

FIG. 19 is a flowchart for a medium quality evaluating process in FIG. 18.

DETAILED DESCRIPTION OF THE PREFERRED EMBODIMENTS

Figure 1:
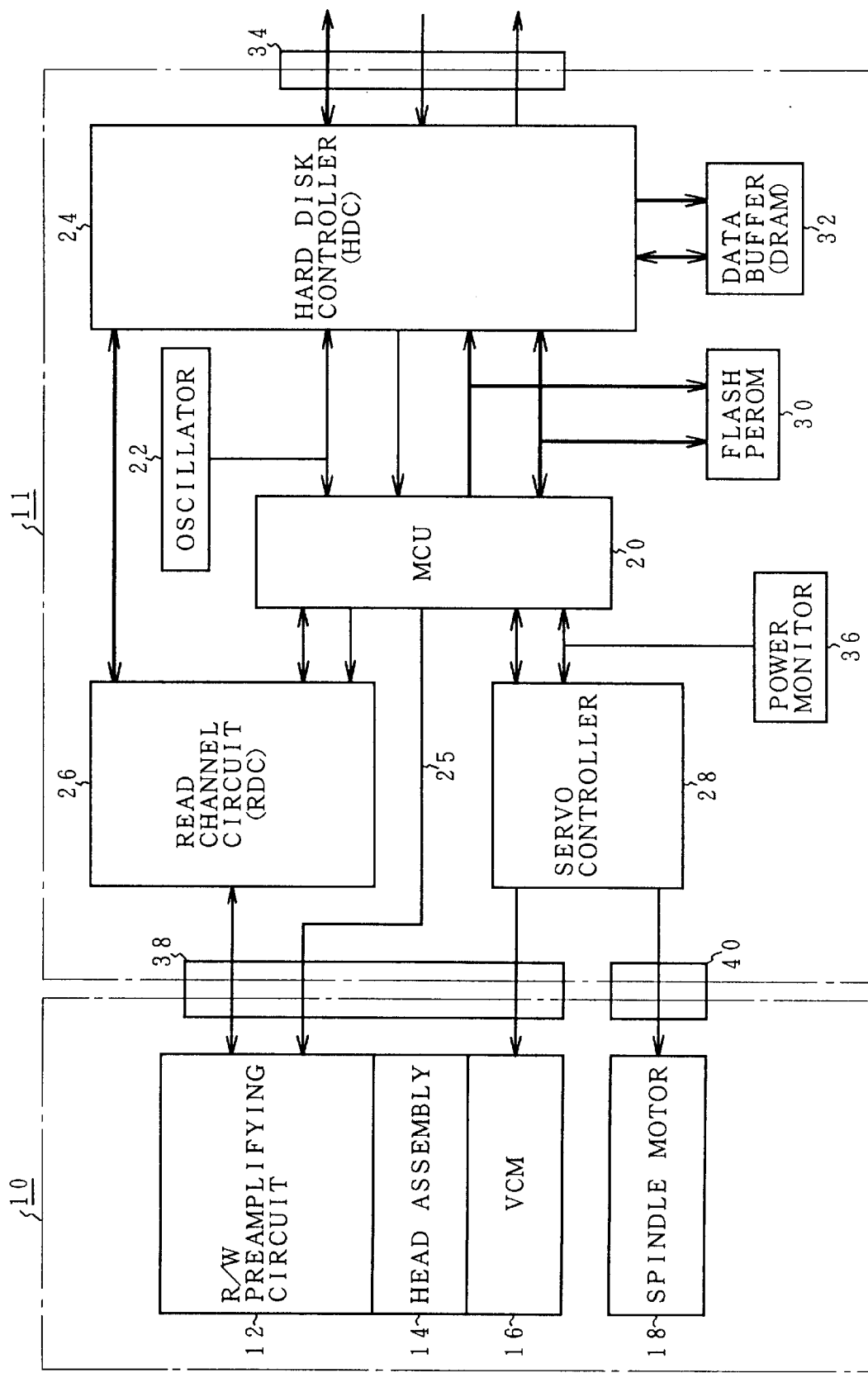
FIG. 1 is a block diagram of a magnetic disk apparatus to which the invention is applied.

FIG. 1 shows an embodiment of a storage apparatus of the invention and a magnetic disk apparatus known as a hard disk drive (HDD) is shown as an example. The magnetic disk apparatus is constructed by a disk enclosure 10 and a control circuit board 11. The disk enclosure 10 has an R/W preamplifying circuit 12, a head assembly 14, a voice coil motor (hereinbelow, called a "VCM") 16, and a spindle motor 18. The R/W preamplifying circuit 12 is mounted as a head IC circuit, for example, on an FPC 38 which connects an apparatus casing and a head actuator. The R/W preamplifying circuit 12 has multi-functions such that a head selection, a setting of a write current, and a setting of a sense current of an MR head can be performed from the outside, and various functions including reading, a write selection, and a head selection can be controlled by a register setting via a serial transfer line 25 from the control circuit board 11. Combination heads of only the number corresponding to the number of recording surfaces of disk media are provided in the head assembly 14. Each of the combination heads is integrally made up of a write head using an inductive head and a read head using an MR head. For example, when the number of disk media is equal to three, the number of recording surfaces of the media is equal to six, so that six combination heads each comprising a set of read head and write head are provided. It will be obviously understood that the head assembly 14 is supported by a front edge of the head actuator driven by the VCM 16 and is moved in the direction traversing tracks on the disk medium.

Figure 2B:
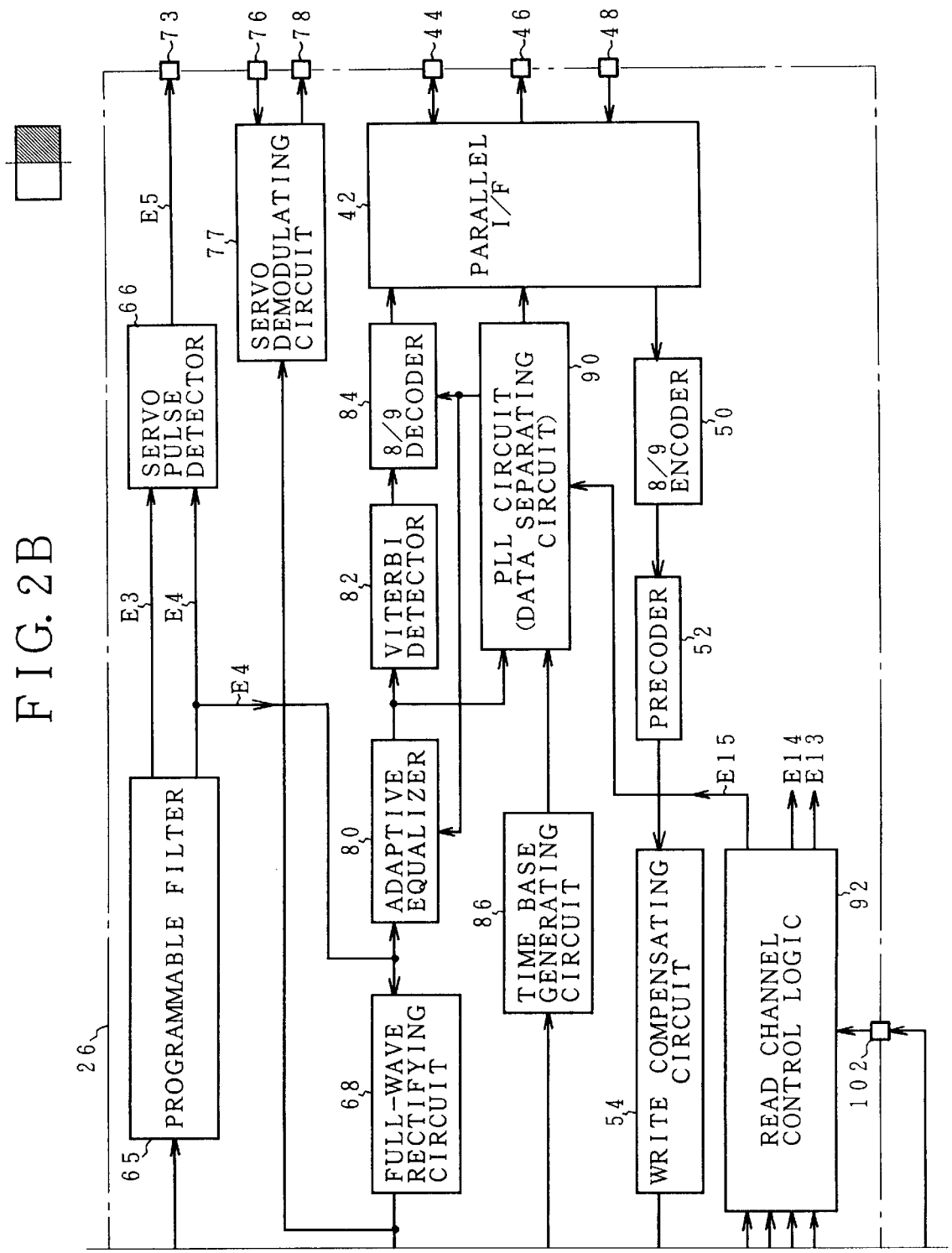

The control circuit board 11 has an MCU (micro control unit) 20, an oscillator 22, a hard disk controller (HDC) 24, a read channel circuit (RDC) 26, a servo controller 28, a data buffer 32 using a DRAM, an interface connector 34 with an upper apparatus, and a power monitor 36. For example, when a write access from the upper apparatus is received, the MCU 20 stores write data received via the interface connector 34 into the data buffer 32. After that, a write gate signal is outputted from the hard disk controller 24 to the read channel circuit 26, thereby setting a write operating state. After executing a predetermined formatting to the write data read out from the data buffer 32, the resultant write data is supplied to the read channel circuit 26. The read channel circuit 26 executes an 8/9 conversion, a preceding, and a write compensation to NRZ write data from the hard disk controller 24, after that, supplies the data to the R/W preamplifying circuit 12 in the disk enclosure 10, converts the data to a write current by a write driver, and executes a writing operation to the disk medium by the write head in the head assembly 14 selected at that time. On the other hand, when the MCU 20 receives a read access from the upper apparatus, the hard disk controller 24 is activated, and a read gate signal is generated to the read channel circuit 26, thereby allowing the reading operation to be executed. In such a state, the read signal from the selected MR head in the head assembly 14 in the disk enclosure 10 is amplified by the R/W preamplifying circuit 12 and is, after that, supplied to the read channel circuit 26. The read channel circuit 26 performs an equalization for a maximum likelihood detection of Partial Response Class 4 with respect to the inputted read signal, subsequently executes a Viterbi detection, and finally executes an 8/9 inverse conversion, thereby converting the signal to the NRZ data. After that, the NRZ data is outputted to the hard disk controller 24. The hard disk controller 24 executes an ECC process to the read data from the read channel circuit 26 and, after that, transfers the resultant read data to the upper apparatus via the data buffer 32. In any one of the write access and the read access by the MCU 20, the servo controller 28 executes a head positioning control by the driving of the VCM 16 so that the head assembly 14 is sought so as to be on a track of a cylinder address determined by an access address at that time. The power monitor 36 monitors a power source voltage supplied to the magnetic disk apparatus. When the power source voltage drops to a level lower than a predetermined voltage, the power monitor 36 outputs a reset signal to the MCU 20 and the like. FIGS. 2A and 2B are block diagrams of the read channel circuit 26 provided for the control circuit board 12 in FIG. 1. In the read channel circuit 26, a write modulating unit is constructed by an 8/9 encoder 50 provided subsequently to a parallel interface 42, a precoder 52, a write compensating circuit 54, and a write FF 56. An operating state of the read channel circuit 26 is obtained by signal settings at ports 94, 96, 98, and 100 for a read channel control logic 92. Various parameters necessary for the operation of the read channel circuit 26 are register set into the port 94 by a serial transfer. A read gate signal E10 from the hard disk controller 24 is supplied to the port 96. A write gate signal E11 from the hard disk controller 24 is supplied to the port 98. Further, a servo gate signal E12 from the hard disk controller 24 is sent to the port 100. At the time of the writing operation, the write gate signal E11 to the port 98 of the read channel control logic 92 is enabled and the write modulating unit from the 8/9 encoder 50 provided subsequently to the parallel interface 42 to the write FF 56 enters the operating state. That is, the NRZ data is supplied to a port 44 of the parallel interface 42 and a write clock is simultaneously supplied to a port 48. The NRZ write data from the parallel interface 42 is converted to an 8/9 code by the 8/9 encoder 50, is subjected to a 1/(1+D) precoding for the purpose of maximum likelihood detection of Partial Response Class 4 by the precoder 52, is subjected to a write compensation by the write compensating circuit 54, and is frequency divided by the write FF 56. After that, the resultant signal is converted to a write current by a write driver on the R/W preamplifying circuit 12 side and is magnetically recorded to the disk medium by the write head. A read demodulating unit of the read channel circuit 26 is divided into a servo demodulating unit and a data demodulating unit. First, a read signal E2 from the R/W preamplifying circuit 12 is supplied to a port 60. Subsequent to the port 60, a high pass filter 62, an AGC amplifier 64, and a programmable filter 65 are provided. With respect to an input stage of the read signal E2, the data demodulation is also similarly executed in the servo system. The programmable filter 65 realizes both of a function as a low pass filter and a function as a differentiating circuit with respect to the read signal from the AGC amplifier 64. The signal passed through the low pass filter is supplied as a read signal E4 to a servo pulse detector 66 and is also sent to a full-wave wave rectifying circuit 68 and an adaptive equalizer 80 on the data demodulating unit side. A differentiation signal E3 by the differentiating circuit realized by the programmable filter 65 is supplied to the servo pulse detector 66. The servo pulse detector 66 detects a peak of the read signal E4 serving as an output of the low pass filter at a timing of a zero-crossing of the differentiation signal E3, detects cylinder information included in servo information, and generates it from a port 73. The read signal E4 outputted from the low pass filter of the programmable filter 65 is rectified by the full-wave rectifying circuit 68, an amplitude component is extracted from the read signal E4, and its output signal is supplied to a servo demodulating circuit 77. According to this embodiment, for example, a two-phase servo pattern is recorded in a servo region of the disk medium, so that four position signals A, B, C, and D which are well known in the two-phase servo signal are outputted as signals demodulated by the servo demodulating circuit 77. A strobe/reset signal for controlling a timing of the servo demodulation is supplied to a port 76. On the other hand, the data demodulating unit is constructed by the adaptive equalizer 80 for receiving the output signal E4 of the low pass filter in the programmable filter 65, a Viterbi detector 82, and an 8/9 decoder 84. That is, the read signal E2 from the R/W preamplifying circuit 12 is amplified by an automatic gain control in the AGC amplifier 64. After that, the signal passes through the low pass filter in the programmable filter 65 and is supplied to the adaptive equalizer 80 and is subjected to a waveform equalization adaptive to Partial Response Class 4 (PR4). Subsequently, the read data is demodulated by the maximum likelihood detection according to the Viterbi algorithm by the Viterbi detector 82. Subsequently, the maximum likelihood detected read data was 8/9 inverse converted into the original NRZ data by the 8/9 decoder 84. After that, the NRZ data is outputted to the parallel interface 42. At the time of the reading operation, the read signal from the adaptive equalizer 80 is inputted to a PLL 90 functioning as a data separating circuit. A read clock synchronized with the read signal of the disk medium is generated and is supplied as a sync clock to the adaptive equalizer 80 and 8/9 decoder 84. After completion of the frequency division, the read clock is outputted from a port 46 of the parallel interface 42. For the servo demodulation period in which the read signal is not obtained, the read clock is generated on the basis of a reference clock from a time base generating circuit 86 to which a reference clock signal from a port 88 is inputted. An AGC loop of the AGC amplifier 64 for amplifying the read signal E2 is constructed by the full-wave rectifying circuit 68 and an AGC charge pumping circuit 70. An AGC holding circuit 72 is provided for a line of an AGC control signal of the AGC amplifier 64 from the AGC charge pumping circuit 70. The AGC holding circuit 72 holds an AGC control voltage from the AGC charge pumping circuit 70 at that time by a holding signal E7 from an AGC control logic 75 having a port 74 and can temporarily stop a tracing operation for a fluctuation in the read signal E2 of the AGC amplifier 60.

In such a read channel circuit 26, according to the present invention, a fault signal E8 from a TA fault detecting circuit 115 which is provided for the R/W preamplifying circuit 12 and detects an abnormal fluctuation in the read signal by the TA phenomenon of the MR head is inputted from a port 102 to the read channel control logic 92. When the fault signal E8 based on the TA phenomenon is received by the read channel control logic 92, by executing a switching control for raising a cut-off frequency of the high pass filter 62 provided for the read channel circuit 26, a control for locking the AGC loop for the AGC amplifier 64, and further, a control for locking the PLL of the PLL circuit 90, an error caused by the read signal E2 which is fluctuated by the TA phenomenon of the MR head is avoided. As control signals for the error avoidance by the read channel control logic 92 when the fault signal E8 is obtained, a filter switching signal E13 is outputted to the high pass filter 62, an AGC holding signal E14 is outputted to the AGC holding circuit 72, and further, a PLL holding signal E15 is outputted to the PLL circuit 90. The signals E13, E14, and E15 for the error avoidance are outputted for a predetermined time T from a time point when the fault signal E8 for the port 102 trails. When it is assumed that, for example, an abnormal fluctuation time of the read signal E2 by the TA phenomenon is equal to 1 $\mu$sec, an output time of the signals E13 to E15 for the error avoidance is set to T=about 2 to 5 $\mu$sec. That is, the signals E13 to E15 for the error avoidance are outputted for the time T1 within a time that is several times as long as the fluctuation period of the read signal E2 by the TA phenomenon, thereby suppressing an adverse influence by the read signal E2 fluctuated due to the TA phenomenon.

Figure 3:
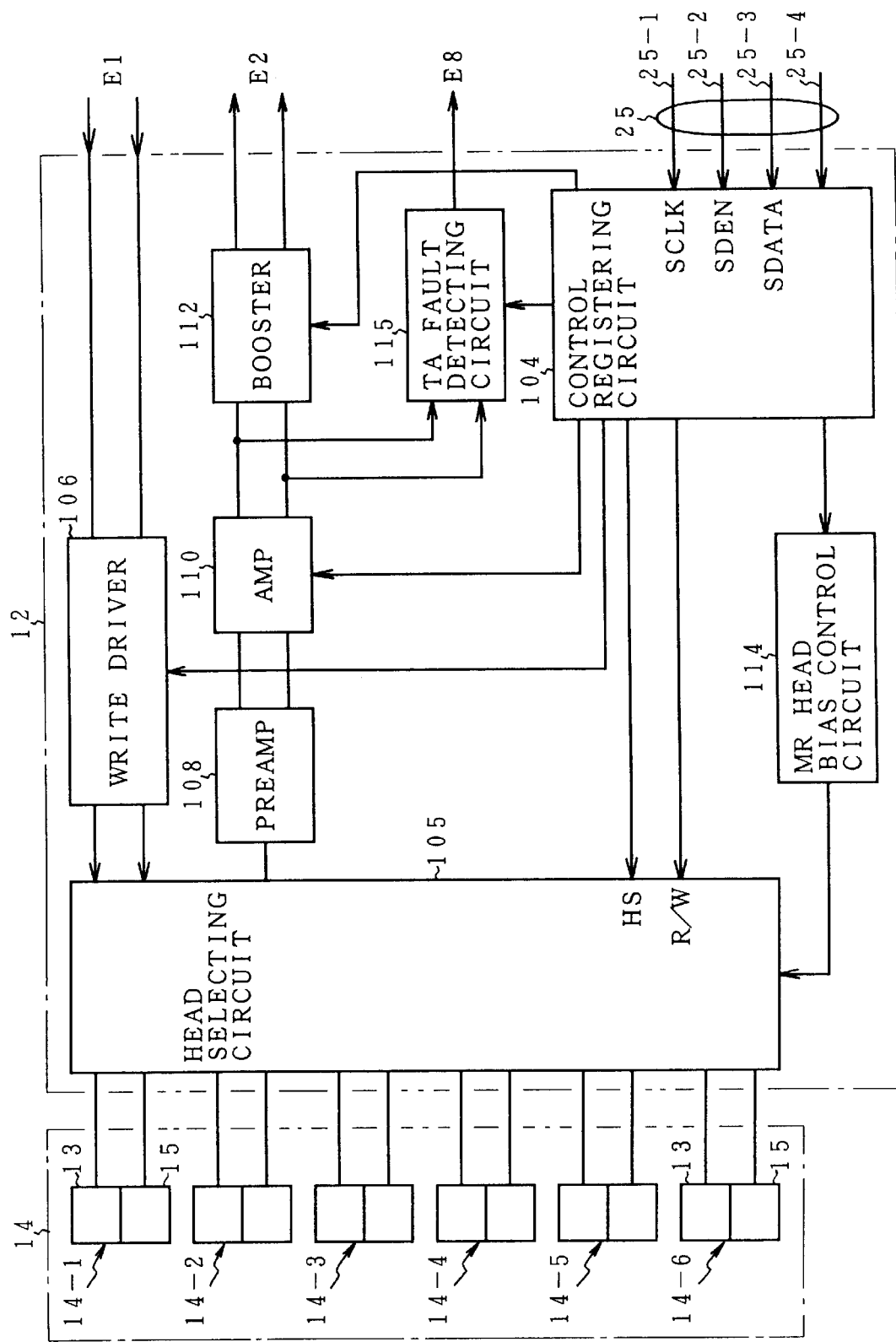
FIG. 3 is a block diagram of an R/W preamplifying circuit in FIG. 1.

FIG. 3 is a circuit block diagram of the R/W preamplifying circuit 12 in FIGS. 2A and 2B. The R/W preamplifying circuit 12 has a control registering circuit 104 to which the serial transfer line 25 from the MCU 20 in FIGS. 2A and 2B is connected. The serial transfer line 25 is constructed by three lines of an SCLK transfer line 25-1, an SDEN transfer line 25-2, and further, an SDATA transfer line 25-3. The SCLK transfer line 25-1 supplies a serial transfer clock. The SDEN transfer line 25-2 supplies a serial data enable signal. The serial data enable signal is a signal of "high enable". At the time of disable, the data is set into the control registering circuit 104. The SDATA transfer line 25-3 transfers the serial data. The data identified in response to a leading edge of the serial transfer clock is set into the control registering circuit 104. A signal line 25-4 for switching the reading operation and the writing operation is inputted to the control registering circuit 104. When a read/write switching signal of the signal line 25-4 is at the H level, the reading operation is executed. When it is at the L level, the writing operation is executed. As circuit units which are controlled by the register setting of the serial transfer line 25 by the control registering circuit 104, a head selecting circuit 105, a write driver 106, an amplifier 110, a booster 112, an MR head bias control circuit 114, and the TA fault detecting circuit 115 are provided in the R/W preamplifying circuit 12. The write driver 106 converts a write signal E1 from the read channel circuit 26 in FIGS. 2A and 2B into a write current. The write current of the write driver 105 can be also controlled by a register setting to the control registering circuit 104. For example, as shown in the head assembly 14, combination heads 14-1 to 14-6 are connected to the head selecting circuit 105. Each of combination heads 14-1 to 14-6 integratedly has an inductive head 13 functioning as a write head and an MR head 15 functioning as a read head. Any one of the heads provided for the head assembly 14 can be selected by receiving the register setting of the head number to the control registering circuit 104 and the setting of the read/write switching signal. A read signal from the proper MR head 15 selected by the head selecting circuit 105 is amplified by a preamplifier 108 and is, thereafter, amplified by the amplifier 110. A gain of the amplifier 110 can be controlled by a register setting using the serial transfer line 25 to the control registering circuit 104. In the booster 112 provided subsequently to the amplifier 110, for example, a booster frequency of a high band emphasis can be switched to 72 MHz or 114 MHz by the register setting to the control registering circuit 104. Further, in the MR head bias control circuit 114, a sense current which is supplied to the MR head 15 selected by the head selecting circuit 105 at the time of the reading operation can be controlled by the register setting by the control registering circuit 104. Further, the read signal amplified by the amplifier 110 whose gain can be controlled by the control registering circuit 104 is inputted to the TA fault detecting circuit 115. A threshold of the TA fault detecting circuit 115 can be arbitrarily set by the register setting of the control registering circuit 104. In the invention, the threshold to detect the fault signal in association with the peculiar TA phenomenon can be set every MR head 14 and a cylinder position of the disk medium by using a control function of a setting change of the threshold TH of the TA fault detecting circuit 115 by the control registering circuit 104. For example, TLS24F556A made by Texas Instruments Co., Ltd. or the like can be used as an R/W preamplifying circuit 12 in which the advanced function is realized by the register setting by the serial transfer in FIG. 3 as mentioned above.

FIGS. 4A to 4E are time charts for the detection of the fault signal by the TA fault detecting circuit 115 provided for the R/W preamplifying circuit 12 and for various error avoiding processes in the read channel circuit 26. FIG. 4A shows a waveform change of the read signal E2 when the TA phenomenon of the MR head 15 occurs. After the base line suddenly rose in such a direction as to increase an amplitude by receiving the thermal asperity by a collision of the MR head 15 with a scratch or the like of the medium, an amplitude fluctuation which is recovered to the original state is caused due to a reduction in temperature. For such an amplitude abnormality of the read signal E2 caused due to the TA phenomenon as mentioned above, the predetermined threshold TH is set into the TA fault detecting circuit 115. When an increase in base line of the read signal E2 exceeds the threshold TH, the fault signal E8 which trails to the L level as shown in FIG. 4B is generated. The fault signal E8 is supplied to the read channel control logic 92 of the read channel circuit 26. As shown in FIGS. 4C, 4D, and 4E, synchronously with the trailing edge from the H level to the L level of the fault signal E8, the filter switching signal E13 is set to the H level and the AGC holding signal E14 and PLL holding signal E15 are set to the L level for a predetermined time T1. The output time Ti during which each of the signals E13 to E15 is at the H level is longer than the output period of the L level of the fault signal E8 during which at least the read signal E2 exceeds the threshold TH but is set to about a time which doesn't exceed a time until the read signal E2 in FIG. 4A is settled to the original state. For example, now assuming that the fluctuation time due to the TA phenomenon of the read signal E2 is equal to 1 μsec, it is sufficient to set T1 to about 2 to 5 μsec.

Figure 5:
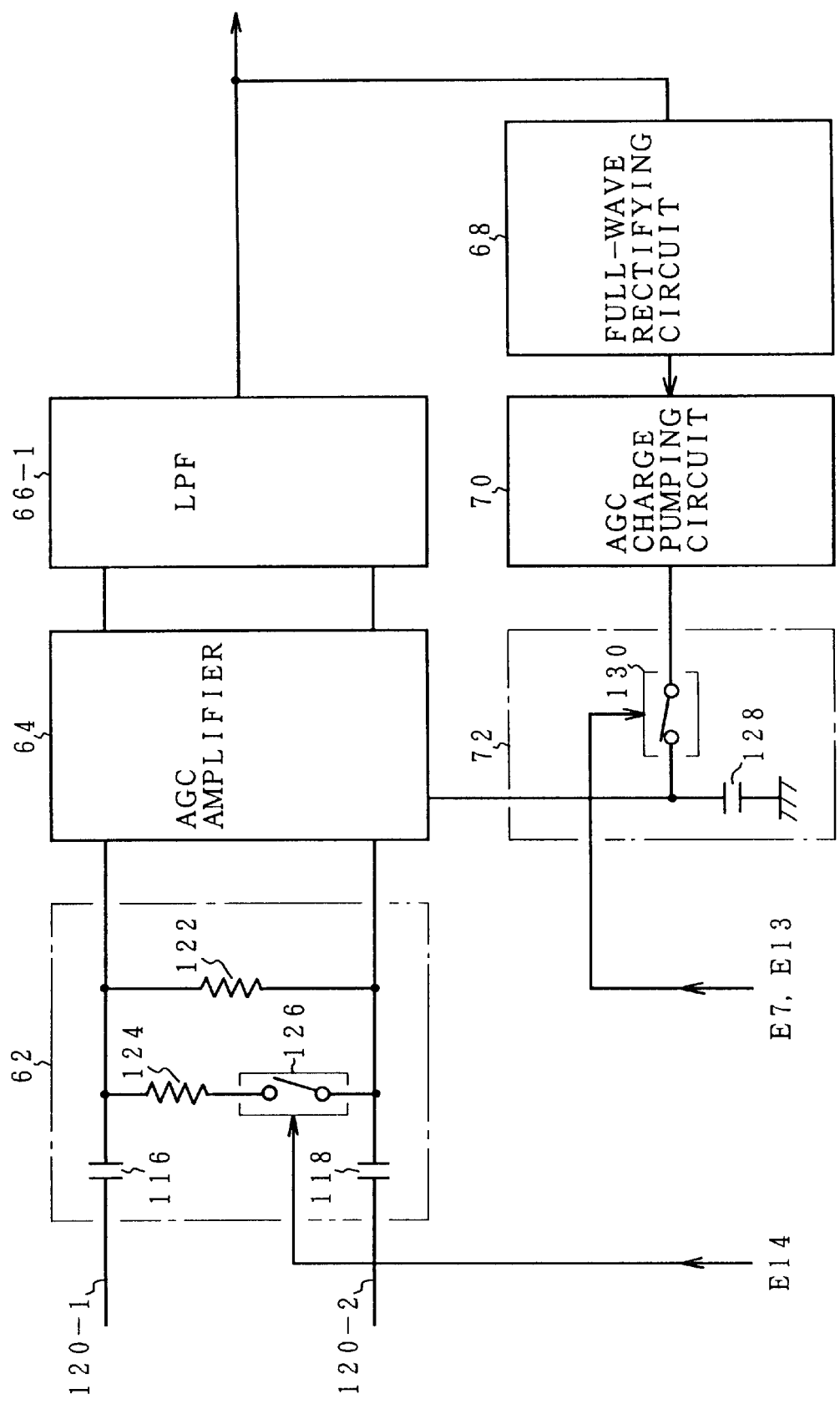
FIG. 5 is a circuit diagram of a high pass filter and an AGC holding circuit in FIGS. 2A and 2B.

FIG. 5 is a specific circuit diagram of the high pass filter 62 provided at the front stage of the AGC amplifier 64 in FIGS. 2A and 2B and the AGC holding circuit 72 provided for the AGC loop. In the high pass filter 62, a cut-off frequency f1 is set by capacitors 116 and 118 inserted to balance lines 120-1 and 120-2 from the R/W preamplifying circuit 12 and a register 122 connected between them. The cut-off frequency f1 in this case is set to about f1=200 kHz as shown in FIG. 6. That is, the cut-off frequency f1 is set so that an enough pass band is given even with respect to a servo signal whose frequency is sufficiently lower than that of the data. A resistor 124 and an analog switch 126 are serially connected in parallel with the resistor 122. The analog switch 126 is turned on by an H level output of the filter switching signal E13 synchronized with the fault signal E8 in FIG. 4C. By connecting the resistor 124 in parallel with the resistor 122 and reducing a resistance value, the cut-off frequency of the high pass filter 62 is raised from f1 to f2. The cut-off frequency f2 after the switching is switched to, for example, f2=2 MHz as shown in FIG. 6.

FIGS. 7A to 7D show changes in the read signal when the cut-off frequency is switched from f1 to f2 by the high pass filter 62 in FIG. 5. That is, FIG. 7A shows the read signal E2 which is inputted to the high pass filter 62. A fluctuation such that the base line exceeds the threshold TH is caused by the TA phenomenon. On the basis of it, the fault signal E8 in FIG. 7B is derived. The filter switching signal E13 is outputted as an H level signal for the time T1 as shown in FIG. 7C. By the turn-on of the analog switch 126 in FIG. 5, the cut-off frequency of the high pass filter 62 is switched from f1=200 kHz to f2=2 MHz. By the switching to the cut-off frequency f2=2 MHz, signal components whose frequencies are lower than the cut-off frequency f2=2 MHz and which are included in the read signal E2 in FIG. 7A are attenuated and removed. Thus, the amplitude fluctuation of the read signal and the fluctuation period of time are suppressed as shown in FIG. 7D. Consequently, as compared with the case of the cut-off frequency f1=200 kHz, the period of time of the read signal during which a read error occurs becomes sufficiently short by setting the cut-off frequency f2=2 MHz. When the fluctuation period is short, even if the demodulation data is lost for such a period, it can be settled within a range of a correction data length by the ECC circuit provided for the hard disk controller 24 at the post stage. Thus, even if a loss of read signal by the TA phenomenon occurs, the generation of the read error can be fairly prevented.

Referring again to FIG. 5, in the AGC holding circuit 72 provided for the AGC loop from the AGC charge pumping circuit 70 to the AGC amplifier 64, a capacitor 128 is provided subsequently to an analog switch 130 and a charge voltage of the capacitor 128 is supplied as an AGC control voltage to the AGC amplifier 64. The analog switch 130 is controlled by the holding signal E7 from the AGC control logic 75 in FIGS. 2A and 2B or the holding signal E13 from the read channel control logic 92. In the normal state in which the AGC lock is not performed, the analog switch 130 is held in the ON state and the AGC loop is formed. The AGC charge pumping circuit 70 generates the AGC control voltage so as to keep a predetermined AGC level in accordance with the amplitude fluctuation of the read signal which is inputted to the AGC amplifier 64 and charges into the capacitor 128, thereby controlling the gain of the AGC amplifier 64. On the other hand, when the fault signal E8 in FIG. 4B is obtained by the fluctuation of the read signal A2 by the TA phenomenon as shown in FIG. 4A, the AGC holding signal E14 in FIG. 4D trails to the L level from the H level so far. Therefore, the analog switch 130 is turned off and the charge voltage of the capacitor 128 by the output of the AGC charge pumping circuit 70 at the time point when the fault signal E8 trails to the L level is held. The gain of the AGC amplifier 64 is fixed by the charge voltage of the capacitor 128 for the predetermined time T1 during which the analog switch 130 is OFF. Therefore, even if the read signal E2 largely fluctuates over the threshold TH due to the TA phenomenon as shown in FIG. 4A, a control to reduce the gain of the AGC amplifier 64 according to the level fluctuation is not performed. After the elapse of the predetermined time T1 during which the AGC holding signal E14 is at the L level, the read signal in FIG. 4A which was fluctuated by the TA phenomenon is again returned to the normal level. In this instance, by setting the AGC holding signal E14 to the H level and by turning on the analog switch 130, the AGC loop is recovered. At this time, the fluctuated read signal E2 has already been returned to the stable level and the AGC control is in the optimum gain control state that is almost adapted to the read signal. The read signal can be stably amplified by the AGC control without disturbing the AGC loop by the TA phenomenon. By such an AGC locking control, a situation such that the AGC loop is abnormally disturbed and the read signal cannot be demodulated and the loss period of time is extended can be certainly prevented.

Figure 8:
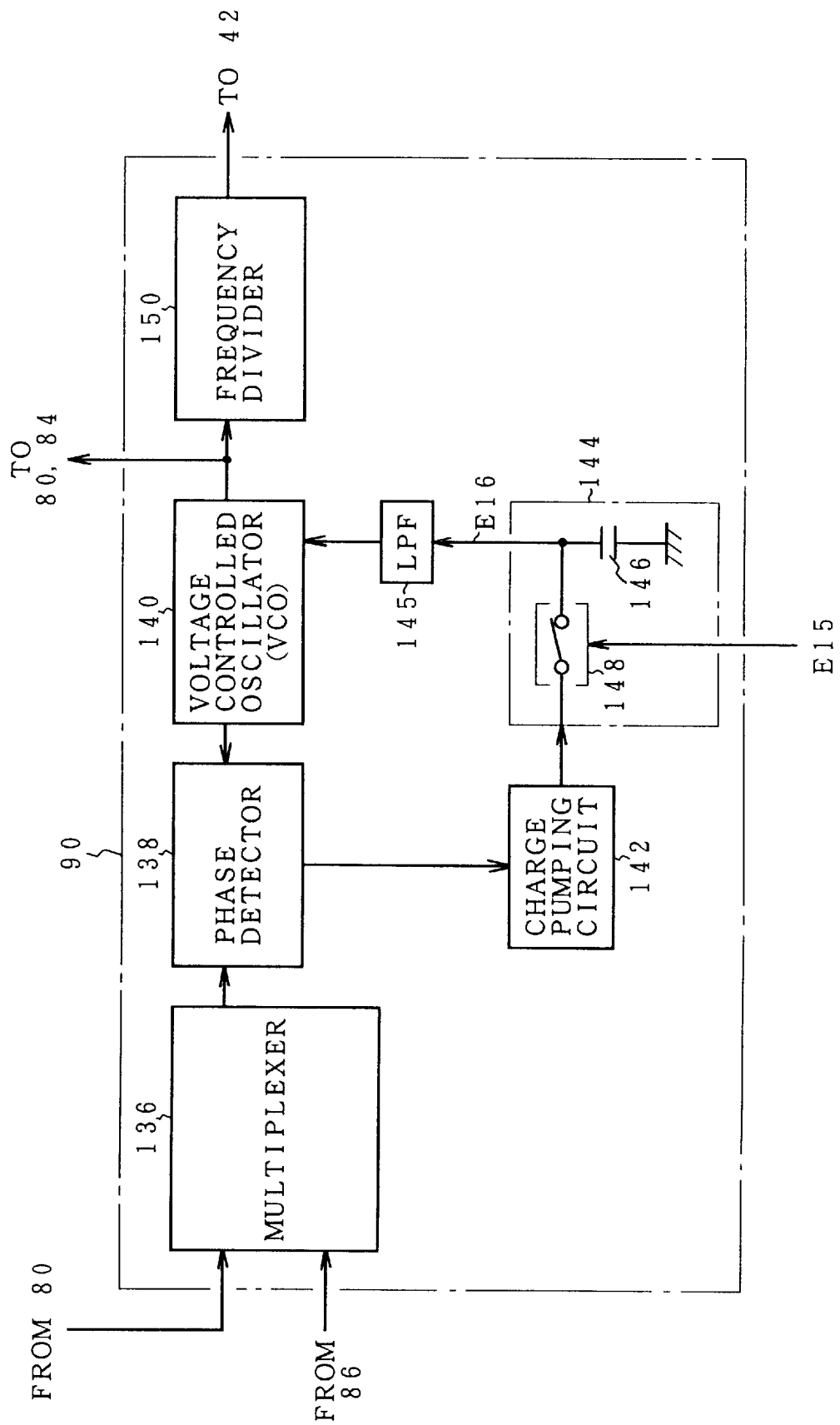
FIG. 8 is a block diagram of a PLL circuit in FIGS. 2A and 2B.

FIG. 8 is a circuit block diagram of the PLL circuit 90 in FIGS. 2A and 2B. The PLL circuit 90 has a multiplexer 136, a phase detector 138, a voltage controlled oscillator (VCO) 140, a PLL holding circuit 144, and a frequency divider 150. When the read gate signal E10 of the read channel control logic 92 in FIGS. 2A and 2B is enable, the multiplexer 136 selects the read signal generated from the adaptive equalizer 80 and supplies it to the phase detector 138. At the time of reading of a servo region in which the servo gate signal E12 is enabled and at the time of writing of the data, since no read signal is generated from the adaptive equalizer 80, the multiplexer 136 supplies a reference clock from the time base generator 86 to the phase detector 138. In the reading operation, the phase detector 138 detects a phase difference between the read signal from the adaptive equalizer 80 derived from the multiplexer 136 and an oscillation signal from the voltage controlled oscillator 140 and supplies the phase difference to a charge pumping circuit 142. The charge pumping circuit 142 outputs a control voltage E16 according to the detected phase difference from the phase detector 138 to the VCO 140, thereby performing a voltage control so that a phase difference from an oscillating frequency is equal to 0. The PLL holding circuit 144 is provided in the middle of a PLL loop from the charge pumping circuit 142 to the VCO 140. An output of the charge pumping circuit 142 is supplied to a capacitor 146 through an analog switch 148 that is ON in a stationary state. A charge voltage of the capacitor 146 is supplied as a voltage control signal E16 to the VCO 140. Actually, in order to stabilize the PLL loop, the voltage control signal E16 is supplied to the VCO 140 through a low pass filter 145. The oscillation signal from the VCO 140 is directly supplied as a read clock to the adaptive equalizer 80 and 8/9 decoder 84 in FIG. 3 and is, further, frequency divided by the frequency divider 150. After that, the signal is supplied as a read clock to the parallel interface 42 and is outputted to the port 46.

When an amplitude fluctuation exceeding the threshold TH due to the TA phenomenon occurs in the read signal E2 as shown in FIG. 9A, the PLL holding circuit 144 of the PLL circuit 90 receives a level output of the PLL holding signal E15 in FIG. 9C synchronized with the fault signal E8 in FIG. 9B, turns off the analog switch 148 of the PLL holding circuit 144, and shuts off the PLL loop. Therefore, the charge voltage of the capacitor 146 when the fault signal E8 is obtained is fixedly outputted as a voltage control signal E16 to the VCO 140. FIG. 9D shows a change in control voltage E16 when the PLL holding circuit 144 as shown in FIG. 8 is not provided but an output of the charge pumping circuit 142 is directly supplied to the VCO 140. FIG. 9E shows a change in control voltage E16 when the PLL holding circuit 144 is provided as shown in FIG. 8. In case of FIG. 9D in which the PLL lock is not performed, a sudden phase difference is caused due to the amplitude fluctuation exceeding the threshold TH due to the TA phenomenon of the read signal E2 in FIG. 9E and the control voltage E16 of the VCO 140 fluctuates. After that, the control voltage E16 is also slowly returned to the original state by tracing the recovery of the read signal E2. On the other hand, in case of performing the PLL lock in FIG. 9E, the control voltage E16 is maintained constant for a time T by the holding of the control voltage E16 by the capacitor 146 due to the turn-off of the analog switch 148 when the fault signal E8 is obtained. When the PLL loop is recovered by the turn-on of the analog switch 148 after the elapse of the time T, the fluctuated read signal E2 is stable at the original amplitude level and the phase control by the PLL loop corresponding to the read signal is promptly started. By the lock of the PLL loop when the fault signal is derived as mentioned above, a situation such that the PLL loop is not satisfied by the amplitude fluctuation of the read signal due to the TA signal and a read error is caused due to a timing abnormality of the read clock can be avoided.

Figure 10:
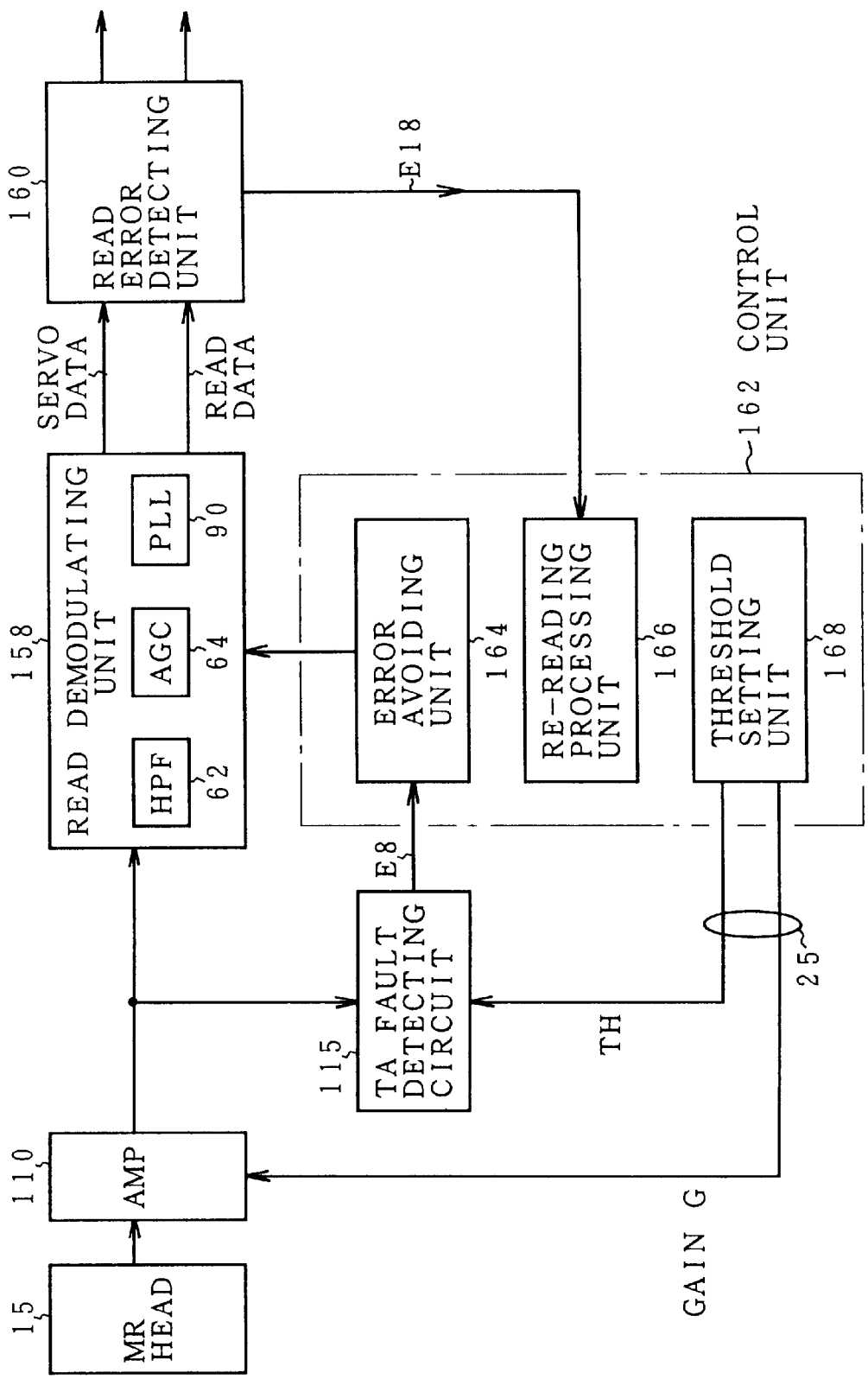
FIG. 10 is a functional block diagram of the invention for performing a TA error avoiding process in a real-time manner on the basis of a fault detection.

FIG. 10 is a functional block diagram of an error recovering process by the detection of the fault signal in association with the TA phenomenon in the magnetic disk apparatus of the invention with respect to the read channel circuit 26 in FIGS. 2A and 2B as a target. The read signal from the MR head 15 is amplified by the amplifier 110 which is provided on the R/W preamplifying circuit 12 side and whose gain can be controlled. After that, the signal is supplied to a read demodulating circuit 158 which is realized as a circuit function of the read channel circuit 26. The read demodulating unit 158 has the high pass filter 62 having a cut-off frequency switching function for error avoidance, the AGC amplifier 64 having the AGC locking function, and further, the PLL circuit 90 having a PLL locking function. Servo data and read data from the read demodulating unit 158 are supplied to a read error detecting unit 160. Specifically speaking, the read error detecting unit 160 is realized by the hard disk controller 24 in FIG. 1. An error of the servo data is an error such as loss of pulses or the like due to the servo pulse detector 66 shown in FIGS. 2A and 2B. An error of the read data is an error about the number of bytes exceeding a correcting ability by the ECC circuit provided for the hard disk controller 24. When the error of the servo data or read data is detected, the read error detecting unit 160 generates a read error detection signal E18. A control unit 162 has an error avoiding unit 164, a re-reading processing unit 166, and a threshold setting unit 168 for setting a threshold into the TA fault detecting circuit 115. The error avoiding unit 164 can be realized by the read channel control logic 92 provided in the read channel circuit 26 in FIGS. 2A and 2B. The re-reading processing unit 166 and threshold setting unit 168 are realized by a program control of the MCU 20 provided for the control circuit board 11 in FIG. 1. In the magnetic disk apparatus of the invention, it is necessary to make the threshold setting unit 168 operative at the stage before the magnetic disk apparatus is shipped from the factory and to preset the threshold TH which is used for detection of the fault signal E8 by the TA fault detecting circuit 115. The setting of the threshold TH to the TA fault detecting circuit 115 can be realized by the register setting by the serial transfer line 25 to the control registering circuit 104 provided for the R/W preamplifying circuit 12 shown in FIG. 3.

Figure 11:
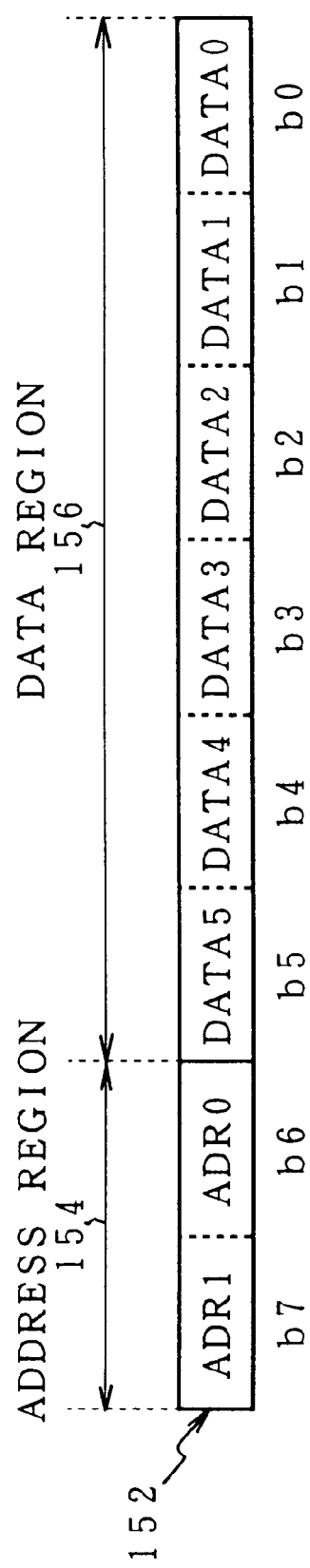
FIG. 11 is an explanatory diagram of a format for explaining serial transfer data to the R/W preamplifying circuit in FIG. 3.

FIG. 11 shows a format of 8-bit serial transfer data 152 which is used for setting of the threshold TH of the TA fault detecting circuit 115 to the control registering circuit 104. In the serial transfer data 152, the upper two bits among eight bits are used as an address region 154 and the remaining six bits are used as a data region 156. As for the serial transfer data 152 as mentioned above, it is possible to designate an address and to set various operating mode parameters as shown in FIG. 12. As operating modes, a sleep mode XSLP, an idle mode XIDL, head selections HS3 to HS0, a gain control mode GAIN, a TA recovery wide band frequency control TARFH, MR head bias currents IB3 to IB0, a TA recovery mode TAREC, a TA compensating mode TACMP, TA thresholds TA3 to TA0, boosters BST1 and BST0, and write currents IW3 to IW0 can be set. Among them, the setting of the threshold TH to the TA fault detecting circuit 115 which is used in the invention can be controlled by setting the register into 15 levels within a range from 49 millivolts to 385 millivolts including the off state by using the 4-bit data TA3 to TA0 as shown in FIG. 13.

Figure 14:
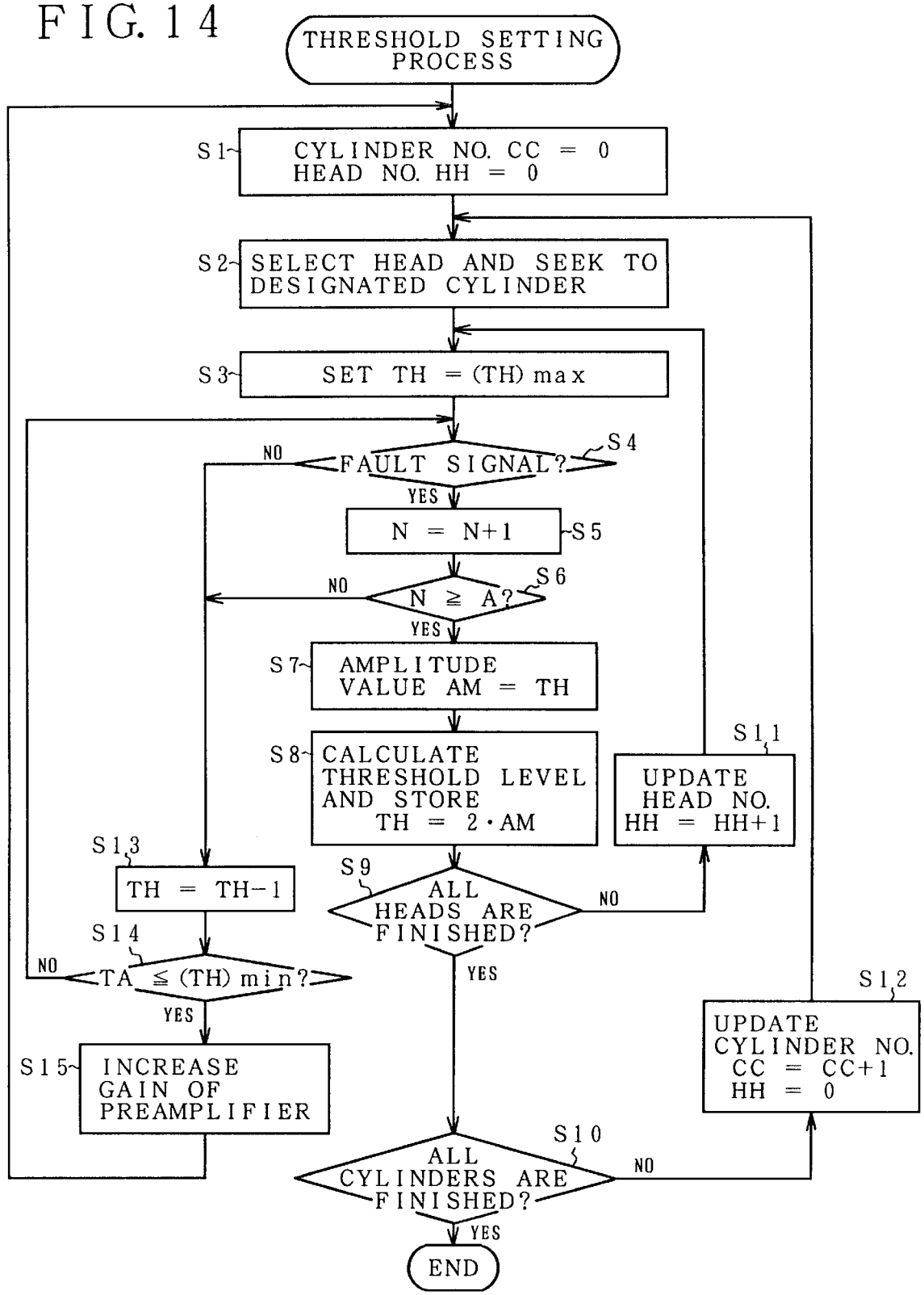
FIG. 14 is a flowchart for a setting process by a threshold setting unit in FIG. 10.

FIG. 14 shows the setting process of the threshold TH for the fault detection of the TA fault detecting circuit 115 by the threshold setting unit 168 in FIG. 10. First in step S1, a cylinder address in which the reading operation to set the threshold is designated. The cylinder address can be also designated in the servo region or data region. Actually speaking, since the threshold is determined on a cylinder unit basis in the direction from the inner side to the outer side of the disk medium or in the opposite direction, it is sufficient to set the cylinder address to CC=0 in step S1. Since the threshold is decided every MR head, a head number is set to HH=0. Subsequently in step S2, the head of the number designated in this instance is selected and the head is likewise sought to the designated cylinder. In step S3, a predetermined maximum value (TH)max among the thresholds TH is set. The reading operation of the MR head is executed in this state and a check is made in step S4 to see if the fault signal can be obtained from the TA fault detecting circuit. Since the threshold TH has been set to a high value at the initial stage, no fault signal can be derived. Therefore, the threshold TH is reduced by one stage in step S13. In step S14, a check is made to see whether the threshold TH is equal to or lower than a minimum value (TH)min which can be set or not. When the threshold value doesn't reach the minimum value (TH)min, a check is made in step S4 to see if the fault signal is obtained by the updated threshold TH. By reducing the threshold TH step by step in this manner, the threshold approaches the amplitude of the read signal obtained in this instance. When the threshold TH is reduced to a certain threshold level, the fault signal is obtained in step S4. When the fault signal is detected in step S4, a count value of a counter (N) is counted up in step S5. The operation to count up the count value of the counter (N) each time the fault signal is obtained is repeated while clearing the counter each time an index of every rotation of the disk is obtained. When the count value of the counter (N) indicative of the number of fault signals which are obtained per rotation of the disk is smaller than a predetermined value (A) in step S6, since the threshold TH doesn't sufficiently approach the amplitude level of the read signal in this instance, the processing routine advances to step S13 and the threshold TH is further reduced by one level. The detection of the fault signal in step S4 is repeated. When the threshold TH almost coincides with the amplitude level of the read signal at that time, the value of the counter (N) counted in step S5 is equal to or larger than the predetermined value (A) in step S6. Therefore, step S7 follows and the threshold TH in this instance is set into an amplitude value AM of the read signal. In step S8, the threshold TH is calculated by multiplying a predetermined coefficient $\alpha$ (for example, $\alpha$=2) to the amplitude value AM obtained in step S7 and the cylinder address CC and head number HH at this time are stored as indices into a memory. The amplitude value AM obtained in step S7 can be also stored in place of the calculated threshold TH. Subsequently in step S9, a check is made to see if the processes have been finished with respect to all of the heads. If NO, the head number is updated in step S11. After that, the processing routine is returned to step S3 and similar processes are repeated with regard to the next MR head. If YES in step S9, a check is made to see if the processes have been finished with respect to all of the cylinders in step S10. If NO, the cylinder number CC is updated and, simultaneously, the head number is initialized in step S12. After that, the processing routine is returned to step S2 and similar processes are repeated with respect to the next cylinder. In the processes for reducing the threshold TH step by step until the fault signal is obtained in steps S4, S11, and S12, when the fault signal is not detected in step S4 and the threshold TH reaches the minimum value (TH)min in step S14, the processing routine advances to step S15. In this state, since the level of the read signal is too low, the gain of the amplifier 110 provided in the R/W preamplifying circuit 12 is increased. The processing routine is returned to step S1 and the threshold setting process is repeated from the beginning. In the threshold setting process in FIG. 10, the threshold TH to detect the fault signal is obtained on a cylinder unit basis. However, it is also possible to divide into zones of every plural tracks and to decide the threshold TH on a zone unit basis.

Figure 15:
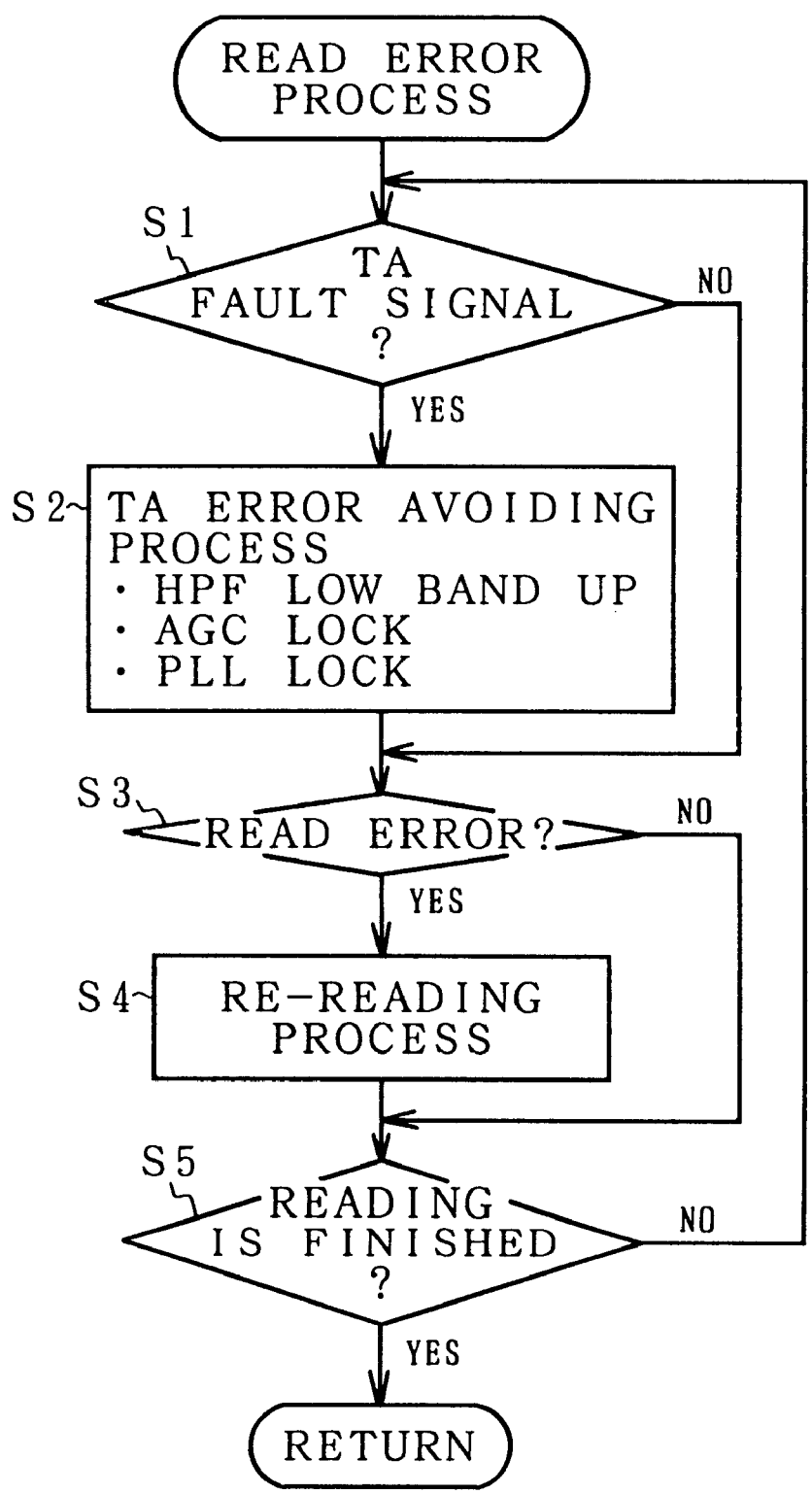
FIG. 15 is a flowchart for a read error process according to an embodiment of FIG. 10.

FIG. 15 is a flowchart for a read error process in the embodiment of FIG. 10. The read error process is characterized in that the TA error recovering process by the error avoiding unit 164 is performed in a real-time manner for an output of the fault signal E8 by the TA fault detecting circuit 115. That is, in step S1, the presence or absence of the fault signal E8 from the TA fault detecting circuit 115 is checked. When the TA fault signal is obtained, step S2 follows and the error avoiding unit 164 immediately raises the cut-off frequency of the high pass filter and performs the AGC lock and PLL lock. Therefore, when the TA fault signal is obtained, a hardware-like process to avoid the TA error is always performed. On the other hand, when the read error is detected by the read error detecting unit 160 as in step S3, the re-reading process is executed in step S4 without particularly distinguishing whether the error is the error due to the TA phenomenon or the read error due to external noises, shock, or the like. Such processes in steps S1 to S4 are repeated until the reading operation is finished in step S5.

Figure 16:
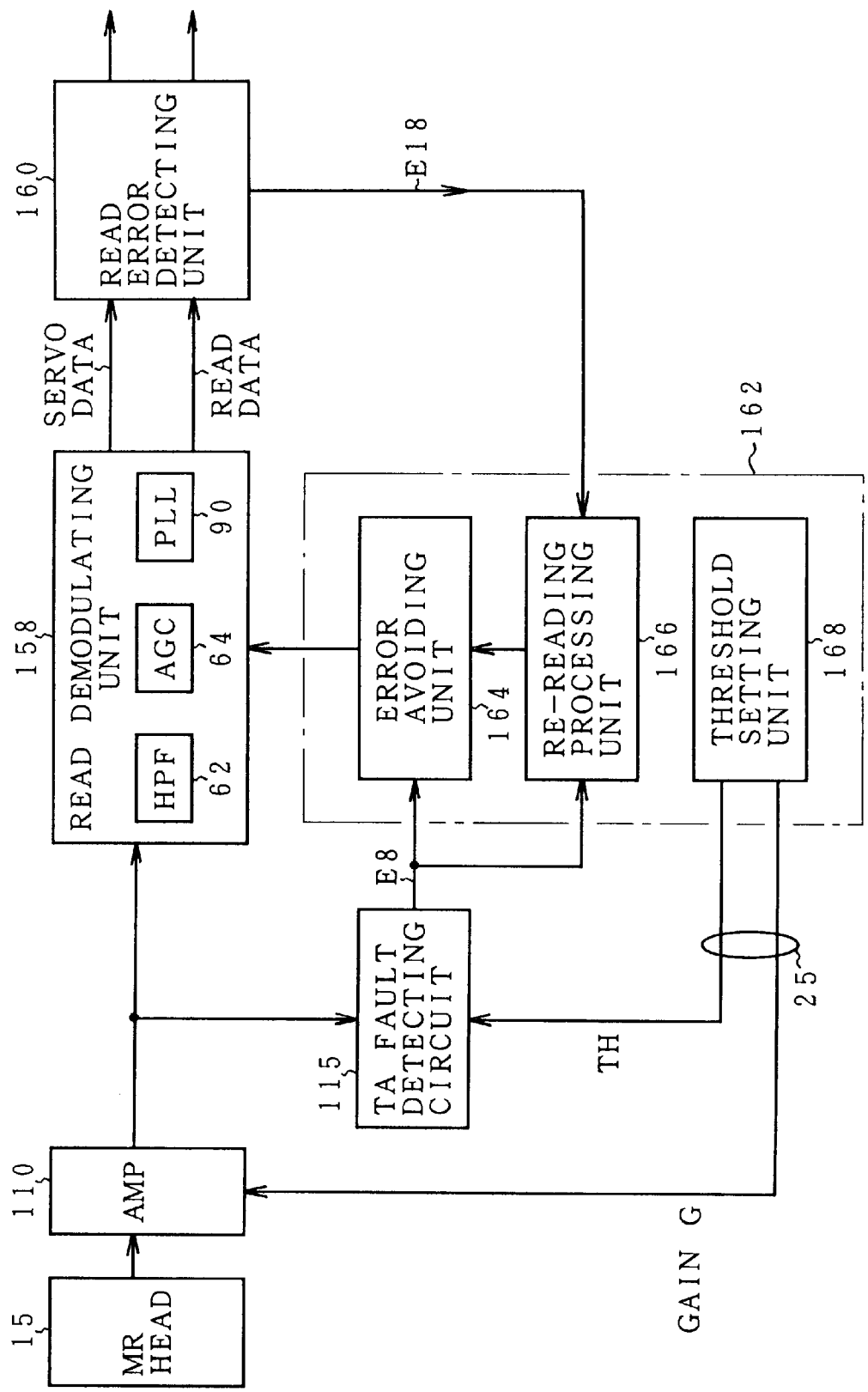
FIG. 16 is a functional block diagram of another embodiment for performing re-reading operation accompanied with the TA error avoiding process when a read error and a TA fault are simultaneously detected.

FIG. 16 is a functional block diagram of another embodiment for a read error due to the TA phenomenon of the invention. In the embodiment, the re-reading processing unit 166 provided for the control unit 162 discriminates whether the TA fault signal E8 has been obtained by the TA fault detecting circuit 115 when the read error detection signal E18 is obtained by the read error detecting unit 160 or not. When the TA fault signal E8 is obtained, the re-reading processing unit 166 validates the operating function of the error avoiding unit 164 and, thereafter, executes the re-reading process. On the other hand, when the TA fault signal E8 is not obtained, the operating function of the error avoiding unit 164 is invalidated and the re-reading process is executed in this state. This is because it is necessary to prevent the error avoiding operation of the TA phenomenon which is not inherently necessary in the case where the fault signal E8 from the TA fault detecting circuit 115 is outputted due to an erroneous operation irrespective of the TA phenomenon of the MR head. That is, in a state in which the fault signal E8 is obtained by the erroneous operation of the TA fault detecting circuit 115, if the switching of the cut-off frequency of the high pass filter 62 to the wide band side, the lock of the AGC loop by the AGC amplifier 64, and the PLL lock by the PLL circuit 90 are executed by the error avoiding unit 164, an attenuation amount of the low frequency components of the read signal increases and, for example, the servo data cannot normally be demodulated. The AGC control which traces the read signal and the generation of the read clock are disturbed by the lock of the AGC loop and PLL loop and there is a fear such that the read error is contrarily induced by the unnecessary error avoiding operation. Therefore, when the read error is detected by the read error detecting circuit 160 with respect to the servo data and read data obtained by performing the reading operation, whether the read error has been caused by the TA phenomenon or not is discriminated by checking whether the TA fault signal E8 has been obtained so far or not. In this instance, when it is decided that the read error was caused due to the TA phenomenon, the error avoiding unit 164 is validated and the re-reading process is performed. When the fault signal E8 is not obtained, it is determined that the read error was caused due to external noises or vibration, so that the re-reading process is executed without validating the error avoiding unit 164.

Figure 17:
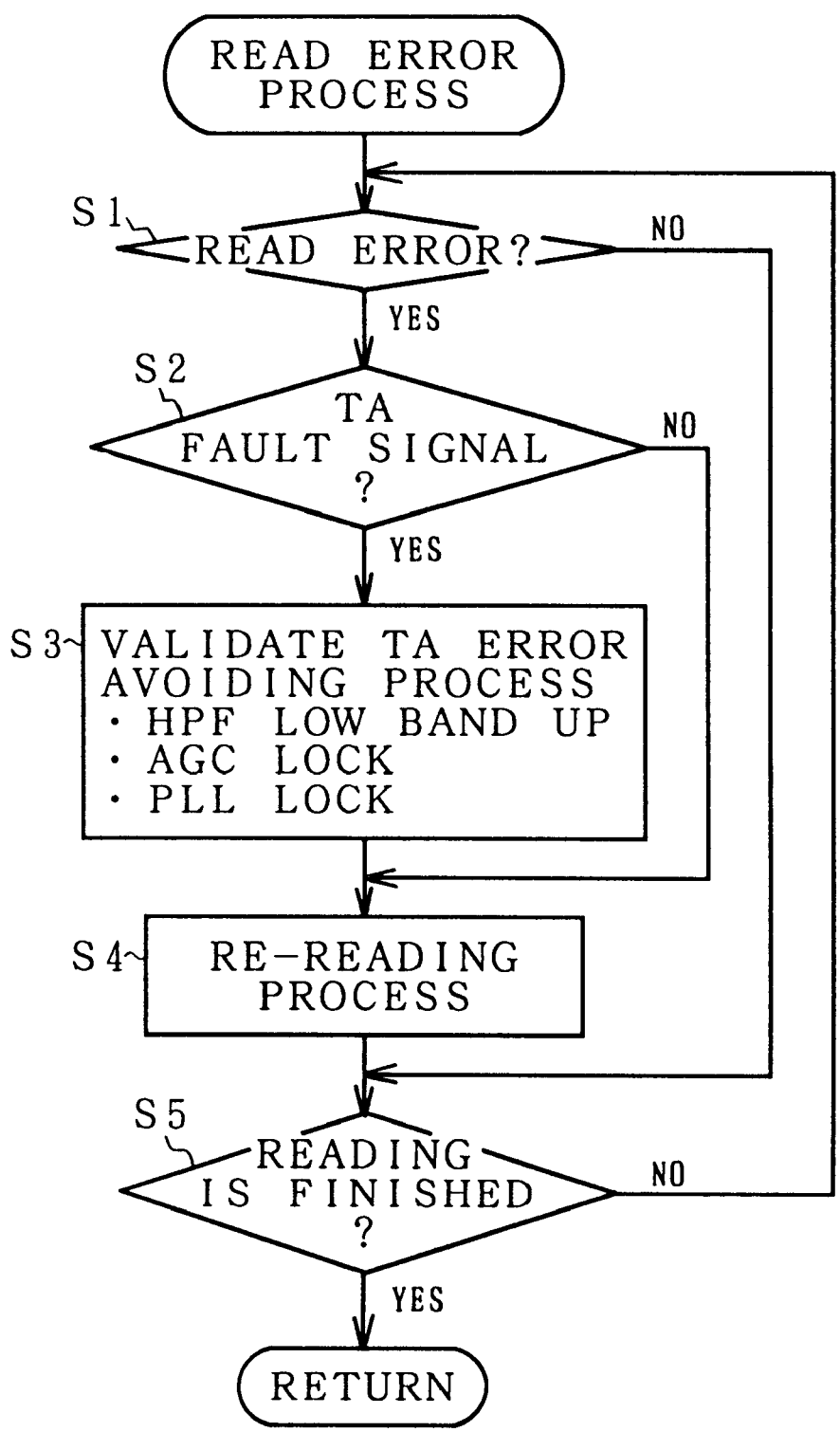
FIG. 17 is a flowchart for the read error process according to the embodiment of FIG. 16.

FIG. 17 is a flowchart for the read error process in the embodiment of FIG. 16. When the read error is discriminated in step S1, a check is made in step S2 to see if there is a TA fault signal. When the TA fault signal is obtained, the TA error avoiding process is validated in step S3. The re-reading process is performed in step S4. When the TA fault signal is not obtained in step S2, the re-reading process is executed in step S4 without validating the TA error recovering process in step S3. Such processes are repeated until the end of the reading operation in step S5.

Figure 18:
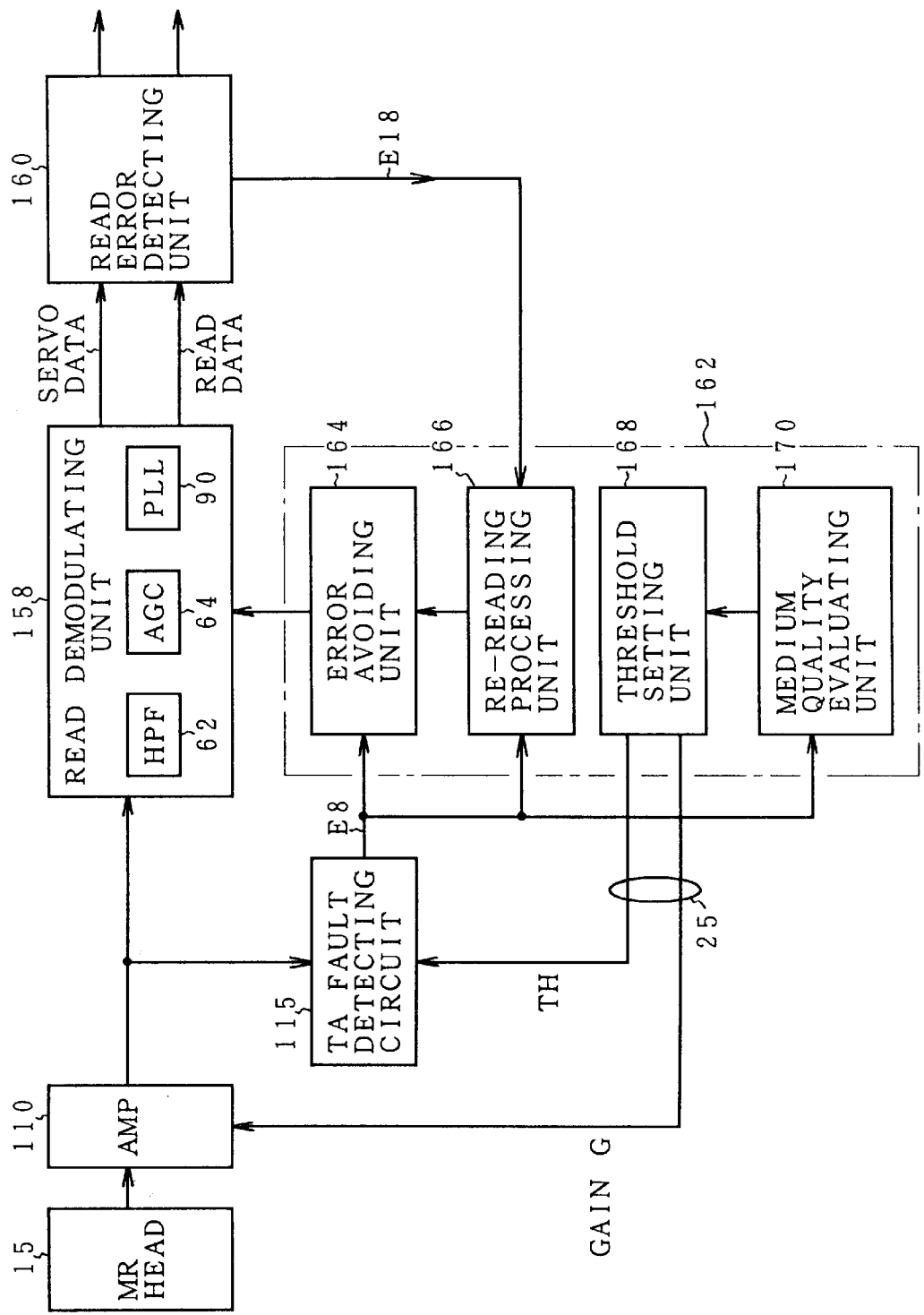
FIG. 18 is a functional block diagram of another embodiment for evaluating a quality of a medium for the TA by using a fault detection of a TA detecting circuit.

FIG. 18 shows another embodiment of the invention and is characterized in that the state of the TA phenomenon is discriminated by using the TA fault detecting circuit, thereby examining a quality of a medium. That is, in the embodiment of FIG. 18, for example, a medium quality evaluating unit 170 is further provided for the control unit 162 with respect to the embodiment of FIG. 16. The medium quality evaluating unit 170 sets the threshold TH for the TA fault detecting circuit 115 so as to obtain the medium quality level by using the threshold setting unit 168. In this state, for example, the number of fault signals E8 from the TA fault detecting circuit 115 is counted on a cylinder unit basis while positioning the MR head 15 to the whole surface of the medium. A count value per cylinder, the medium quality level set by the threshold TH at that time, and the TA position where the fault signal is obtained are stored. After completion of the medium evaluating process, the data of the evaluation result is reported to a tester of an external unit. When the evaluating process of the medium quality is executed by the medium quality evaluating unit 170, the functions of the error avoiding unit 164 and re-reading processing unit 166 are obviously stopped.

FIG. 19 is a flowchart for the medium quality evaluating process by the medium quality evaluating unit 170 of FIG. 18. First in step S1, the threshold TH of the TA fault detecting circuit 115 is set to the medium quality level. In step S2, the cylinder address CC and head address HH are initialized. In step S3, the head is sought to the designated cylinder. After that, the track is read by the designated head in step S4. A check is made in step S5 to see if the index can be obtained. When the index is obtained, the counter (N) is cleared in step S6. The presence or absence of the detection of the fault signal is subsequently discriminated in step S7. When the fault signal is obtained, the counter (N) is counted up in step S8. The counting process of the fault signals in steps S7 and S8 is repeated until the index is obtained in step S9, namely, for a period of time of one rotation of the cylinder. When the index is obtained in step S9, the value of the counter (N) at that time, namely, the number (N) of medium loss due to the TA phenomenon is stored by using the address CCHH in step S10. The above processes are repeated until the processes are finished with respect to all of the heads in step S11 while updating the head number in step S12. When the processes are finished with regard to all of the heads in step S11, a check is made to see if the processes have been finished with respect to all of the cylinders in step S13. If NO, the cylinder number is updated in step S14 and the head number is initialized. After that, the processes from step S3 are repeated. When the processes are finished with regard to all of the cylinders in step S13, the information about the count value of the TA loss of each cylinder, medium quality level, and TA loss position obtained in this instance every head is reported to the tester.

In FIG. 18, although the medium quality evaluating unit 170 has been provided with regard to the embodiment of FIG. 16, the medium quality evaluating unit 170 can be also similarly provided for the control unit 162 with respect to the embodiment of FIG. 10.

According to the invention as mentioned above, the TA phenomenon of the MR head is properly detected by setting the optimum threshold for the read signal and the reproduction waveform signal fluctuated by the TA phenomenon can be promptly recovered to the stable state. Since the fluctuated signal is recovered early, the error is settled within the loss of read data that can be corrected by the ECC. The read error due to the TA phenomenon can be remarkably reduced by the recovery by the ECC. When the read error is obtained, whether the fault signal due to the TA phenomenon has simultaneously been obtained or not is discriminated. When the fault signal due to the TA phenomenon is obtained simultaneously with the read error, it is determined that the error was caused due to the TA phenomenon. The error avoiding process for the TA is validated and the re-reading process is executed. When the read error is not the error due to the TA phenomenon, the re-reading process is executed without performing the recovering process for the TA error. It is, consequently, possible to certainly prevent a situation such that the read error which is not inherently caused is induced by executing the circuit operation of the unnecessary error avoiding process for the erroneous detection of the fault signal due to the TA phenomenon. Further, by using the function of the fault detecting unit for detecting the abnormal fluctuation of the read signal caused due to the TA phenomenon and generating the fault signal, setting the threshold of the fault detection to the quality evaluation level, and detecting the fault signal with respect to the whole surface of the medium, the quality state of the medium which causes the TA phenomenon is measured by the magnetic disk apparatus itself and can be provided to the external tester.

The process for error avoidance due to the TA phenomenon according to the invention is not limited to the switching of the cut-off frequency of the high pass filter, lock of the AGC loop, and lock of the PLL loop but includes a proper circuit operation so long as an operation to promptly recover the abnormal fluctuation of the read signal fluctuated due to the TA phenomenon. The invention is not limited by the numerical values in the above embodiment.

What is claimed is:
1. A storage apparatus comprising:
   a read demodulating unit demodulating read data and servo data which is used for head positioning from a reproduction waveform signal of a read head;
   a fault detecting unit setting a predetermined threshold for said reproduction waveform signal and outputting a fault signal when said reproduction waveform signal exceeds said threshold;

an error avoiding unit which is provided for said read demodulating unit and operates so as to avoid a read error when said fault signal is generated; and a threshold setting unit monitoring the presence or absence of the output of the fault signal while reducing the threshold of said fault detecting unit in a state in which the head is positioned into a data region of said disk medium and the medium is reproduced and an amplitude value of the reproduction waveform signal is detected, detecting whether the fault signal is generated, setting said detected threshold to an amplitude value of said reproduction waveform signal, and setting a value obtained on the basis of said amplitude into said fault detecting unit as a threshold.

2. An apparatus according to claim 1, wherein said fault detecting unit detects an abnormal fluctuation of a reproduction waveform signal due to a thermal asperity in case of using an MR head as said read head and outputs the fault signal.

3. An apparatus according to claim 1, wherein said error avoiding unit operates so as to promptly recover an abnormal fluctuation of a reproduction waveform signal due to a thermal asperity in case of using an MR head as said read head.

4. An apparatus according to claim 3, wherein said error avoiding unit operates so as to promptly recover an abnormal fluctuation of a reproduction waveform signal due to a thermal asperity for a predetermined time during which the abnormal fluctuation of said reproduction waveform signal continues from a time point when said fault signal is obtained.

5. An apparatus according to claim 3, wherein when said fault signal is obtained, said error avoiding unit raises a cut-off frequency of a high pass filter provided for said read demodulating unit, thereby promptly recovering the abnormal fluctuation of the reproduction waveform signal due to the thermal asperity.

6. An apparatus according to claim 3, wherein when said fault signal is obtained, said error avoiding unit holds a gain of an AGC amplifier provided for said read demodulating unit to a value at a time point when the fault signal is obtained, thereby suppressing that an AGC loop is disturbed by the abnormal fluctuation of the reproduction waveform signal due to the thermal asperity.

7. An apparatus according to claim 3, wherein when said fault signal is obtained, said error avoiding unit holds a loop gain of a PLL provided for said read demodulating unit to a value at a time point when the fault signal is obtained, thereby suppressing that a PLL loop is disturbed by the abnormal fluctuation of the reproduction waveform signal due to the thermal asperity.

8. An apparatus according to claim 1, wherein said threshold setting unit positions the head into a servo region of said disk medium and detects the amplitude value of the reproduction waveform signal.

9. An apparatus according to claim 8, wherein said threshold setting unit sequentially positions the head every cylinder of said disk medium, detects an amplitude value of a reproduction signal about whether the fault signal is generated or not, records said detected amplitude value into a memory or the disk medium, reads out an amplitude value corresponding to a selected head and a cylinder position at the time of a reading operation, and sets the threshold into said fault detecting unit.

10. An apparatus according to claim 8, wherein when the head is positioned to each cylinder of said disk medium and an amplitude value of a reproduction signal about whether the fault signal is generated or not, in the case where the detected amplitude value is equal to or less than a predetermined minimum value, said threshold setting unit raises an amplification factor of an amplifier provided at the front stage of said fault detecting unit and, after that, again retries the detection of the amplitude value.

11. An apparatus according to claim 1, wherein said threshold setting unit positions the head into a data region of said disk medium and detects the amplitude value of the reproduction waveform signal.

12. An apparatus according to claim 1, wherein:

said read demodulating unit has an R/W pre-amplifying circuit, a data demodulating circuit demodulating the read data, and a servo demodulating circuit demodulating the servo data; and the R/W preamplifying circuit has an amplifier whose gain can be controlled and a register setting the gain of said amplifier and the threshold of said fault detecting circuit by a serial transfer from a control unit.

* * * * *